US010706380B2

(12) United States Patent
Sheets et al.

(10) Patent No.: US 10,706,380 B2
(45) Date of Patent: Jul. 7, 2020

(54) SPLIT SHIPMENT PROCESSING

(71) Applicant: Visa International Service Association, San Francisco, CA (US)

(72) Inventors: John Sheets, San Francisco, CA (US); Glen Powell, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 1007 days.

(21) Appl. No.: 14/707,921

(22) Filed: May 8, 2015

(65) Prior Publication Data

US 2015/0324736 A1    Nov. 12, 2015

Related U.S. Application Data

(60) Provisional application No. 61/990,704, filed on May 8, 2014.

(51) Int. Cl.
*G06Q 10/08* (2012.01)
(52) U.S. Cl.
CPC .......... *G06Q 10/08* (2013.01); *G06Q 10/083* (2013.01)
(58) Field of Classification Search
CPC .............................. G06Q 10/08; G06Q 10/083
USPC ....................................................... 705/330
See application file for complete search history.

(56) References Cited

U.S. PATENT DOCUMENTS

| | | | |
|---|---|---|---|
| 7,079,654 B1 * | 7/2006 | Remery ............... | G06Q 20/382 380/278 |
| 7,577,585 B2 | 8/2009 | Horrocks et al. | |
| 7,983,987 B2 | 7/2011 | Kranzley et al. | |
| 10,242,368 B1 | 3/2019 | Poole | |
| 2003/0061171 A1 | 3/2003 | Gilbert et al. | |

(Continued)

FOREIGN PATENT DOCUMENTS

| | | |
|---|---|---|
| KR | 102014005230 A | 5/2014 |
| WO | 2011031804 A1 | 3/2011 |

OTHER PUBLICATIONS

Jason Goddard and Riad Ajami. "Give Banks Credit for Boosting International Trade." May 2013, Robert Morris Associates, The RMA Journal, vol. 95 Issue 8. p. 4. (Year: 2013).*

(Continued)

*Primary Examiner* — George Chen
*Assistant Examiner* — Hunter A Molnar
(74) *Attorney, Agent, or Firm* — Kilpatrick Townsend & Stockton LLP

(57) ABSTRACT

Embodiments of the present invention are directed to methods, apparatuses, computer readable media and systems for obtaining authorization for a plurality of split shipments associated with a single order. In particular, embodiments of the present invention allow a merchant to submit a separate split shipment authorization request for each of the plurality of split shipments. The split shipments authorization requests are linked to the original order using verifiable linking data. The linking data may be extracted from a previous (e.g., initial) split shipment authorization request and/or a previous (e.g., initial) split shipment authorization request. The linking data may be validated by an authorizing entity (e.g., a payment processing network computer or an issuer computer) to ensure validity of a split shipment authorization request. Additionally, the split shipment authorization requests may be validated using one or more predefined split shipment rules.

20 Claims, 12 Drawing Sheets

(56) References Cited

U.S. PATENT DOCUMENTS

| | | | |
|---|---|---|---|
| 2005/0119942 A1* | 6/2005 | Horrocks | G06Q 10/087 |
| | | | 705/26.82 |
| 2005/0240522 A1* | 10/2005 | Kranzley | G06Q 20/02 |
| | | | 705/40 |
| 2009/0265262 A1 | 10/2009 | Chaudhari | |
| 2011/0161233 A1 | 6/2011 | Tieken | |
| 2013/0151292 A1* | 6/2013 | Van Deloo | G06Q 10/02 |
| | | | 705/5 |
| 2014/0006284 A1 | 1/2014 | Faith et al. | |
| 2014/0025571 A1* | 1/2014 | Dooley | G06Q 20/10 |
| | | | 705/40 |
| 2014/0143144 A1 | 5/2014 | DuCharme | |
| 2014/0143146 A1 | 5/2014 | Passanha et al. | |
| 2015/0254639 A1 | 9/2015 | Radu | |
| 2018/0047019 A1 | 2/2018 | Sullivan et al. | |

OTHER PUBLICATIONS

British Application No. GB 1507047.7 filed Apr. 24, 2015 entitled "Method of Retaining Transaction Context", 20 pages.
United Kingdom Search Report dated Oct. 16, 2015 British Application No. GB 1507047.7, 4 pages.
International Search Report dated Jul. 26, 2016 on related PCT Application No. PCT/GB2016/051033, 4 pages.
Final Office Action dated Apr. 15, 2020 for U.S. Appl. No. 15/791,146, 37 pages.

* cited by examiner

SPLIT SHIPMENT PROCESSING

CROSS-REFERENCES TO RELATED APPLICATIONS

The present application is a non-provisional application of and claims priority to U.S. Provisional Application No. 61/990,704, filed on May 8, 2014, the entire contents of which are herein incorporated by reference for all purposes.

BACKGROUND

A purchase order involving multiple items may be split into multiple shipments for a variety of reasons. For instance, some of the items may not be available until a later time. As another example, different items may be available at and/or shipped from different warehouse locations. A consumer may not want to pay for items until the items have actually shipped to reduce the risk of fraud. However, a merchant may desire a guarantee that payment information supplied during an order will still be valid when items are shipped. One approach is to secure payment card authorization for the entire order amount upfront and reversing a portion of the amount if items associated with the amount are not shipped within a certain time period (e.g., 7 days). Such an approach would require re-authorization of the reversed amount when the remaining items are ready to ship. However, such re-authorization after the original authorization could increase a merchant's risk of declined transactions. For example, between 11 am and midnight of the next day, the customer may have exceeded his maximum credit limit.

Embodiments of the present invention address these problems and other problems individually and collectively.

BRIEF SUMMARY

Embodiments of the invention relate to improved methods for conducting split payment transactions.

According to an aspect, a computer-implemented method is provided. The method comprises generating, by the merchant computer, a first split shipment authorization request associated with a first split shipment of a plurality of split shipments associated with a single order, the first split shipment authorization request comprising a first split shipment indicator, a first split shipment amount associated with the first split shipment, and a total amount associated with the order; transmitting, by the merchant computer, the first split shipment authorization request to an authorization computer; receiving, by the merchant computer, a first split shipment authorization response for the first split shipment authorization request from the authorization computer; and extracting, by the merchant computer, a portion of the first split shipment authorization response as part of linking data to be used for a subsequent split shipment authorization request.

In some embodiments, the extracted portion of the first split shipment authorization response includes a category indicator, a payment processing transaction ID, and/or a validation value. The validation value can be generated based at least in part on the total amount.

In some embodiments, the linking data further comprises an authentication response value and a security level indicator that are provided as part of the first split shipment authorization request.

In some embodiments, the method further comprises generating, by the merchant computer, a second split shipment authorization request comprising a second split shipment indicator, a second split shipment amount associated with a second split shipment of the plurality of split shipments associated with the order, the total amount associated with the order, and the linking data; and transmitting, by the merchant computer, the second split shipment authorization request to the acquirer computer.

In some embodiments, the first split shipment indicator indicates an initial shipment of the plurality of split shipments and the second split shipment indicator indicates a subsequent split shipment following the initial shipment. In some other embodiments, the first split shipment indicator indicates a first split shipment of the plurality of split shipments and the second split shipment indicator indicates a second split shipment of the plurality of shipments.

According to an aspect, a computer-implemented method is provided. The method comprises receiving, by a merchant computer, an indication to generate a split shipment authorization request for a split shipment of a plurality of split shipments associated with a single order; retrieving, by the merchant computer, previously-stored linking data that links the split shipment to the order, the linking data extracted from a previous split shipment authorization request and a previous split shipment authorization request associated with a previous split shipment of the plurality of split shipments associated with the order; generating, by the merchant computer, the split shipment authorization request comprising a split shipment indicator, a split shipment amount associated with the split shipment, a total amount associated with the order, and the linking data; and transmitting, by the merchant computer, the split shipment authorization request to an authorization computer.

In some embodiments, the linking data comprises an authentication response value and a security level indicator from the previous split shipment authorization request. The authentication response value can include a cardholder authentication verification value (CAVV) or a token authentication verification value (TAVV). The security indicator can include an electronic commerce indicator (ECI).

In some embodiments, the linking data comprises a category indicator, a payment processing transaction ID, and a validation value from the previous split shipment authorization response. The validation value can be generated based at least in part on the total amount and the authentication response value.

In some embodiments, the previous split shipment authorization request is for an initial split shipment of the plurality of split shipments.

According to an aspect, a computer system is provided. The computer system comprises a memory that stores computer-executable instructions; and a processor configured to access the memory and execute the computer-executable instructions to at least: receive, from a merchant computer, a split shipment authorization request comprising a split shipment indicator, a split shipment amount associated with a split shipment of a plurality of split shipments associated with a single order, a total amount associated with the order, and linking data configured to link the split shipment authorization request to a previously-authorized split shipment of the plurality of split shipments; validate the linking data; generate a split shipment authorization response for the split shipment amount based at least in part on the validity of the linking data; and transmitting the generated split shipment authorization request to the merchant computer.

In some embodiments, the computer system comprises a payment processing network computer.

In some embodiments, the linking data comprises an authentication response value from a previous split shipment authorization request for the previously-authorized split shipment and wherein validating the linking data comprises validating the authentication response value.

In some embodiments, the linking data comprise a validation value from a previous split shipment authorization request for the previously-authorized split shipment and wherein validating the linking data comprises validating the validation value.

In some embodiments, the computer-executable instructions, when executed by the processor, further configure the processor to validate the split shipment authorization request according to one or more predefined split shipment validation rules. The split shipment authorization response can be generated based at least in part on the validation according to the one or more predefined split shipment validation rules.

DETAILED DESCRIPTION

Figure 1:
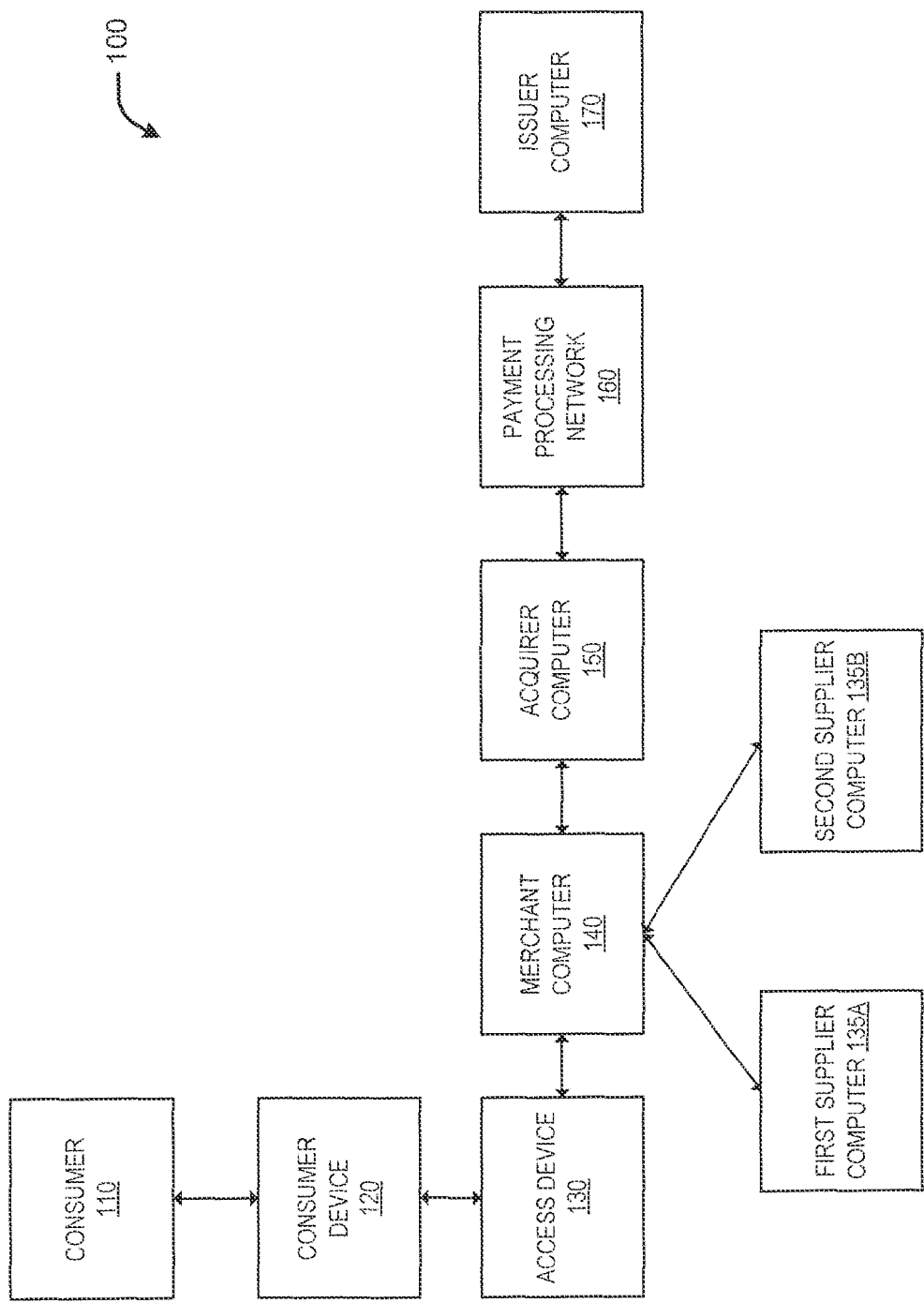
FIG. 1 shows an example of a system that may be used to conduct payment transactions, in accordance with some embodiments.

Embodiments of the present invention are directed to methods, apparatuses, computer readable media and systems for obtaining authorization for a plurality of split shipments associated with a single order. In particular, embodiments of the present invention allow a merchant to submit a separate split shipment authorization request for each of the plurality of split shipments. The split shipments authorization requests are linked to the original order using verifiable linking data. The linking data may be extracted from a previous (e.g., initial) split shipment authorization request and/or a previous (e.g., initial) split shipment authorization request. The linking data may be validated by an authorizing entity (e.g., a payment processing network computer or an issuer computer) to ensure validity of a split shipment authorization request. Additionally, the split shipment authorization requests may be validated using one or more predefined split shipment rules.

In some embodiments, a user may order a plurality of items at a merchant, such as an e-commerce retailer. The merchant may determine a plurality of shipments associated with the items. For example, a first shipment group may comprise a first subset of items in the order, and a second shipment group may comprise a second subset of items in the order. The first shipment group and second shipment group may be separately authorized at the time of the order, ensuring that the payment information provided by the user will be sufficient for the user. For example, a separate authorization hold may be placed on a user's account for each shipping group, each authorization hold being for the value of the items in the shipping group. Later, when a shipping group is ready to be shipped, a clearing process can be performed to actually effect payment for the items in the shipping group. In some embodiments, once clearing has been completed, the item can be shipped. Thus, the user will withhold actual payment for an item until the time the item is shipped, and the merchant will not assume the risk of non-payment of shipped items.

The split payment processing techniques described herein provides several advantages. First, the present invention may facilitate fraud detection with the use of verifiable linking data to tie together split shipment payments associated with a single order. Currently, a fraudulent merchant may use payment information and authorization data associated a first authorized transaction for a second unrelated and/or unauthorized payment. There is no way to securely verify the linkage between the second payment and the first. By requiring that the second authorization request include verifiable linking data that links back to the first transaction, the linkage can be validated to ensure that the merchant is not misusing the payment data associated with the first transaction for any unauthorized purposes. Furthermore, potential dispute resolution may become easier with the use of linking data. For example, given a purchase order, an audit trail of all associated split shipment payments can be determined based on the use of the linking data by the split shipment authorization requests. Lastly, customized rules and logic specific to split shipment processing may be enforced by the validation of the split shipment authorization requests. Such validation can further strengthen the security of the transaction processing system.

Prior to discussing embodiments of the invention, description of some terms may be helpful in understanding embodiments of the invention.

An "authorization request" or "authorization request message" may be an electronic message that is sent to a transaction processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, etc., as well as any other information that may be utilized in determining whether to identify and/or authorize a transaction.

An "authorization response" or "authorization response message" may be an electronic message reply to an authorization request message generated by an issuing financial institution or a transaction processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network) to the merchant's access device (e.g. POS equipment) that indicates approval of the transaction. The code may serve as proof of authorization. As noted above, in some embodiments, a transaction processing network may generate or forward the authorization response message to the merchant.

A "split shipment authorization request" or "split shipment authorization request message" includes an authorization request for a split shipment of a purchase order. The split shipment authorization request may include additional data elements than a non-split shipment authorization request to facilitate the split payment processing. For instance, in some embodiments, a split shipment authorization request can include a split shipment indicator, a total amount associated with the order, and linking data that links to the original purchase order and/or an initial split shipment authorization.

A "split shipment authorization response" or "split shipment authorization response message" includes an authorization response for a split shipment of a purchase order. The split shipment authorization response may indicate validation results for the corresponding split shipment authorization request such as the validation of the linking data, validation according to split shipment rules, and the like.

"Linking data" includes any data that can be used to link one or more split shipment authorization requests to a single order. Linking data may be included in a split shipment authorization request and validated by an authorizing entity to ensure that the validity of the split shipment authorization request. In some embodiments, linking data can include data from a previous (e.g., initial) split shipment authorization request or a previous split shipment authorization response. For instance, the linking data can include security and/or authentication data from a previous split shipment authorization request such as an authentication response value (e.g., cardholder authentication verification value (CAVV)), a security level indicator (e.g., an Electronic Commerce Indicator (ECI)), and the like. Additionally or alternatively, the linking data can include data from a previous split shipment authorization request such as a category indicator (e.g., an Authorization Characteristics Indicator (ACI)), a payment processing transaction ID, a validation value, and the like. The validation value may be generated based on data from the corresponding split shipment authorization request such as the total order amount, the authentication response value, the security level indicator, the transaction ID, and the like.

A "payment request" may include a message comprising a request to process or initiate a payment. For example, the payment request may be sent from mobile device associated with a consumer in relation to a purchase transaction associated with goods or services provided by a merchant. The payment request may include any relevant information to the transaction including payment information (e.g., account identifiers, personal information, etc.), transaction information (e.g., merchant information, items being purchased, etc.), device information (e.g., mobile device phone number, secure element identifier, etc.), routing information (e.g., internet protocol (IP) address of a destination computer, identifier for destination computer, bank identification number (BIN), etc.), and any other relevant information to a payment transaction. For example, a payment request may include encrypted payment information for a transaction and may be sent to a third party computer that is configured to authenticate the payment request, validate a public key certificate, decrypt the encrypted payment information, extract a public key from the validated certificate, re-encrypt the decrypted payment information, and send the re-encrypted payment information to a transaction processor for initiation of a payment transaction. Accordingly, the payment request may include any information relevant to the secure process for transmitting sensitive data to a merchant server for processing a remote transaction.

"Payment information" may include any relevant information for performing a payment. For example, the payment information may include any sensitive account information and/or personal information that may be used to identify and/or authenticate a consumer account at an issuer. Further, in some embodiments, the payment information may also include merchant information, consumer information, mobile device information, routing information, or any other relevant information that may be used to administer, manage, and communicate payment transactions. As such, payment information may include both sensitive and non-sensitive information. Additionally, the payment information may include a portion of account information, personal information, etc., that may be used to perform a transaction. For example, payment information may include the sensitive information associated with a transaction or account and may be sent along with other non-sensitive information that may not be considered payment information (e.g., transaction amount, etc.).

"Payment credentials" may include any information that allows a processor to identify, verify, and/or process a payment transaction using a consumer account. For example, a payment credential may include an account identifier (e.g., primary account number (PAN)), a token (e.g., account identifier substitute), expiration date, card verification value (e.g., CVV, CVV2, dCVV, etc.), a dynamic cryptogram or dynamic value (e.g., dynamic authentication data), personal information associated with an account (e.g., address, etc.), an account alias, or any other relevant information.

"Transaction information" may include any data associated with a transaction. For example, transaction information may include a transaction amount, transaction time, transaction date, merchant information (e.g., registered merchant identifier, address, merchant computer IP address, etc.), product information (e.g., serial numbers, product names or other identifiers, etc.). The transaction information may be provided to a communication device (e.g., mobile device) by a merchant server computer before or after the consumer initiates a payment transaction through the merchant application. In some embodiments, the transaction information may be used to identify a specific merchant associated with a transaction using the merchant information included in the transaction information.

A "payment response" may include a message comprising a response to a request to process or initiate a payment. For example, the payment response may be sent from a server computer in response to a purchase request associated with a remote transaction request associated with goods or services provided by a merchant. The payment response may include any relevant information to the transaction including payment information (e.g., account identifiers, personal information, etc.), transaction information (e.g., items being purchased, merchant information, etc.), device information (e.g., mobile device phone number, secure element identifier, etc.), routing information (e.g., internet protocol (IP) address of a destination computer, bank identification number (BIN), etc.), and any other relevant information. In some embodiments, the payment response may include authentication response information that identifies whether a transaction, account, consumer, and/or other entity to a transaction has been authenticated.

A "transaction processor" may include any entity that is associated with processing a transaction. For example, a merchant, a communication device (e.g., mobile device, desktop computer, etc.), a merchant application or other mobile application on a communication device (e.g., an acquirer application or payment service provider application), an acquirer computer, a payment processing network, and any other entity in a transaction processing eco-system may be a transaction processor. In some embodiments, a transaction processor may be associated with a particular public key (e.g., merchant public key, merchant application public key, acquirer public key, etc.) and private key (e.g., merchant private key, merchant application private key, acquirer private key, etc.) that may be used to encrypt and decrypt payment information during processing of a remote payment transaction.

As such, in some embodiments, the transaction processor may include any entity configured to decrypt the encrypted (or re-encrypted) payment information and initiate a payment transaction. A payment transaction may be initiated through any suitable manner including passing the decrypted payment information to another party or by generating and/or mapping decrypted payment information to an authorization request message. For example, in some embodiments, the transaction processor may initiate a payment transaction by mapping the decrypted payment information to an authorization request message configured to be processed by a payment processing network.

"Security information" may include any data that may be used to authenticate or validate a party or a device. For example, security information may include user authentication data in order to authenticate a user of a device, an account holder, or a consumer associated with an account or transaction. Additionally, security information may include a security value associated with a device, account, or account issuer.

"User authentication data" may include any information that may be used to validate the identity or permissions of a user. For instance, the user authentication data may include a personal identification number (PIN), passcode, password, username, or any other secret information that is shared between trusted parties in order to validate the identity of one or more parties. For instance, in some embodiments, user authentication data may include one or more of a personal identification number (PIN), a passcode, a password, a biometric identifier, or any other unique user information that may be shared and validated by another party. Additionally, the user authentication data may include an indication of a previously authenticated user (e.g., the results of a biometric validation of a user).

Additionally, security information may include a security value that may be used to authenticate a device. A "security value" may include any information that may be used to authenticate a device, account, or payment application as being authentic. The security value may include a static value or a dynamic value. Further, the security value may be generated using a shared secret or other algorithm that may be validated by another entity or system. For example, a security value may include a dynamic value that may change over time (e.g., periodically), change per use (e.g., per transaction), and/or change based on received information (e.g., input information to an algorithm) and may be validated by a system that also has access to a shared algorithm and input data to re-create and validate the security value. For instance, a security value may change every time a transaction is initiated and may be generated using a shared secret algorithm or other shared information between two entities such that one entity may validate that the other entity has access to the shared secret and is thus, authentic.

In some embodiments, the security value may include a cryptogram. For example, a cryptogram may be generated per transaction based on a derived algorithm that is specific to a consumer device and/or issuer account and may be validated at a payment processor or an issuer of the account for each transaction. Such dynamic values may be referred to as dynamic card verification values (e.g., dCVV, dCVV2), unique authentication verification values (UAVV), token authentication verification value (TAVV), etc., and may be distinguished based on the input data and the algorithm used to generate the verifiable dynamic values. For example, a token authentication verification value may use a token (or other account substitute) as an input to a verification algorithm while a dynamic card verification value may use a primary account number (PAN) as an input to the same or a different verification algorithm.

In other embodiments, a secret algorithm used to generate a security value may be known by a single entity. For example, in some embodiments, a remote transaction may be authenticated before an authorization request message is generated and an issuer or a payment processing network may generate an authentication response value using a secret algorithm. When the transaction is initiated and the authorization request message is generated, the authentication response value may be included in the authorization request message and the payment processing network or account issuer may validate the authentication response value using the same secret algorithm and input data to validate the transaction. Accordingly, security values may include cryptograms generated using shared keys (e.g., dynamic verification values, token authentication data, etc.) or secret keys (e.g., authentication response values).

In some embodiments, a payment processing network and/or issuer computer 170 may authenticate security information before receiving an authorization request message for a payment transaction. In such embodiments, a payment processing network and/or issuer computer may return an authentication response including an authentication response value indicating validation of the authentication information if the authentication information is authenticated and/or validated. Accordingly, a transaction processor (e.g., payment processing network computer) may substitute the authentication information with the authentication response value in the payment information before sending the payment information to the transaction processor for initiation of the payment transaction. Thereafter, the authentication response value may be returned to the payment processing network in order to inform the transaction entity that the payment transaction was previously authenticated. Such systems increase the security of transaction processing systems and minimize the chances that the transaction is fraudulent since multiple authentication processes occur at various times during the transaction processing. Additionally, such systems can efficiently authenticate both users and payment devices before a transaction is submitted through a payment processing network and through a single authentication process.

An "authentication response value" may include any data that informs an entity that data, an entity, or a process has been authenticated. For example, an authentication response value may be generated similarly to the security value explained above but may be generated using a different shared secret or algorithm such that another entity within the transaction processing eco-system that has access to the shared secret may determine that the message, account, or other information included in the message has been authenticated by an entity. For instance, particular static data elements (e.g., account identifier, expiration date, transaction time, date, etc.) associated with a transaction may be used as inputs to generate an authentication response value during an authentication process and the calculation may be repeated (using the same data elements) during the payment phase after receiving the authorization request message, to validate that the authentication response value is correct and associated with the same transaction information.

A "token" may include any data substitute. For example, the token may include a substitute for an account identifier at an issuer, payment processing network, merchant, or any other transaction entity. The token may identify a payment account or a non-payment account. As another example, a token may include a substitute for linking data to be used by split shipment transactions. The relationship between the token and the underlying data (e.g., PAN or linking data) can be managed by a token registry or database.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "access device" may be any suitable device that provides access to a remote system. An access device may also be used for communicating with a merchant computer, a transaction processing network, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In the examples provided herein, an access device and merchant computer may be referred to as separate system components. It should be appreciated, however, that the access device and merchant computer may be a single component, for example, one merchant mobile device or POS device.

Embodiments of the invention are described in further detail below.

FIG. 1 shows a block diagram of a typical transaction processing system 100 configured to process transactions, in accordance with some embodiments. The transaction processing system 100 may be configured to process authorization requests for split shipments associated with a single purchase order using methods described herein.

The system 100 may include a consumer device 120 operated by a consumer 110, an access device 130, a merchant computer 140, an acquirer computer 150, a payment processing network computer 160 and an issuer computer 170. The merchant computer 140 may be communicatively connected to one or more supplier computers such as a first supplier computer 135A and a second supplier computer 135B. In some implementations, different entities in FIG. 1 may communicate with each other using one or more communication networks such as the Internet, a cellular network, a TCP/IP network or any other suitable communication network. One or more entities in the system 100 may be associated with a computer apparatus that may be implemented using some of the components as described with reference to FIG. 12.

The consumer 110 may be a person, an automated process, or a semi-automated process. The consumer 110 may utilize the consumer device 120 to initiate a transaction with a merchant by interacting with an access device 130 that is communicatively connected to the merchant computer 140.

The consumer device 120 may be associated with a payment account of the consumer 110. In some implementations, the consumer device 120 may be a mobile device such as a mobile phone, a tablet, a PDA, a notebook, a key fob or any suitable mobile device. For example, the consumer device 120 may include a wallet or a payment application that may be associated with one or more payment accounts of the consumer 110. In some implementations, the consumer device 120 may be configured to display a machine readable code (e.g., QR™ code, bar code, etc.). The consumer device 120 may also include a camera or a scanning device capable of scanning a machine readable code. In some implementations, the consumer device 120 may be capable of communicating with the access device 130 using a short range communication technology such as NFC. For example, the consumer 110 may interact with the access device 130 by tapping or waving the consumer device 120 in proximity of the access device 130. In some implementations, the consumer device 120 may be a payment card such as a credit card, debit card, prepaid card, loyalty card, gift card, etc.

The access device 130 may be an access point to a transaction processing system that may comprise the acquirer computer 150, the payment processing network computer 160, and the issuer computer 170. In some implementations, the access device 130 may be associated with or operated by the merchant computer 140. For example, the access device 130 may be a point of sale device that may include a contactless reader, an electronic cash register, a display device, etc. In some implementations, the access device 130 may be configured to display transaction information in a format that may be read by the consumer device 120 (e.g., mobile phone) including a QR™ code, bar code, or any other information transfer mechanism. In some implementations, the access device 130 may be a personal computer that may be used by the consumer 110 or consumer device 120 to initiate a transaction with the merchant computer 140 (e.g., an online transaction). For example, the access device 130 may include web server configured to provide network documents for implementing a merchant website. As another example, the access device 130 may include a front-end server configured to provide front-end functionalities of a merchant application (e.g., handling user requests) whereas the merchant computer 140 may be configured to provide back-end functionalities (e.g., transaction processing).

The merchant computer 140 may be associated with a merchant. In some embodiments, the merchant computer 140 may be associated with a card-on-file (COF) merchant. For example, the card-on-file merchant may store consumer account information on file (e.g., at a merchant database) for future payment purposes such as various types of periodic payments (e.g., monthly utilities payments). In some implementations, a consumer may register with one or more merchants for card-on-file services. The merchant computer 140 may be configured to generate an authorization request for a transaction initiated by the consumer 110 using the access device 130.

The merchant computer 140 may be communicatively connected to one or more supplier computers 135A and B. The supplier computers may be associated with one or more suppliers capable of providing goods and services to the merchant. The supplier computers 135A and B may be configured to communicate with the merchant computer 140 regarding the availability, procurement, and/or movement of goods and services. The suppliers can include merchants, manufacturers, retailers, wholesalers, dealers, distributors, or any other entity in a supply chain or supply network. In an example, the supplier computers and the merchant computer 140 may be associated with the same merchant. For example, the supplier computers may be located at different warehouse locations or fulfillment centers of the merchant. In another example, the supplier computers may be associated with a different merchant than the merchant associated with the merchant computer 140. In yet some other examples, the supplier computers can include computers associated with manufacturer, retailers, wholesalers, dealers, distributors, or any other entity in a supply chain or supply network. In various embodiments, the supplier computers may or may not be owned by the same entity. For instance, the supplier computers may include a mix of merchant computers (associated with the same or different merchants), manufacturer computers, distributor computers, and the like.

A consumer order may be fulfilled by one or more suppliers. For example, when a consumer buys 100 gadgets from a merchant, the order may be fulfilled by 40 gadgets from a first supplier and 60 gadgets from a second supplier. The first supplier may represent a fulfillment center of a merchant at a first location and the second supplier may represent another fulfillment center of the merchant at a second location. As another example, the first supplier may represent a first retailer and the second supplier may represent a second, different retailer. A supplier computer associated with each supplier may interact with the merchant computer 140 regarding fulfillment of consumer orders that have been placed with the merchant. For instance, the merchant computer 140 may be used to communicate with one or more supplier computers to determine the quantity of goods or services to be supplied by each of the suppliers associated with the supplier computers.

The merchant computer 140 may be configured to process transactions involving split shipments. Split shipments occur when items in a single order are shipped in two or more separate shipments. Split shipments may be necessary when items of the order become available at different times. For instance, a first subset of the items may be available while a second subset of the items may be temporarily out of stock. As such, the first subset of the items may be shipped first while the items from the second subset may be shipped at a later date when they become available. Split shipments may also be necessary when items of the order are shipped from different locations. For instance, some items may be shipped from a first warehouse or fulfillment center at a first location while some other items may be shipped from a second warehouse or fulfillment center at a second, different location.

The merchant computer 140 may be configured to obtain separate authorization for a split shipment amount for each split shipment associated with a single order. The merchant computer 140 can be configured to generate separate split shipment authorization requests corresponding to each of the split shipments. The split shipment authorization requests may be tied to the same order by linking data that may be provided and/or validated by an issuer and/or payment processing network.

The acquirer computer 150 may represent a traditional acquirer/acquirer processor. The acquirer is typically a system for an entity (e.g., a bank) that has a business relationship with a particular merchant, a wallet provider, or another entity. The acquirer computer 150 may be communicatively coupled to the merchant computer 140 and the payment processing network 160 and may issue and manage a financial account for the merchant. The acquirer computer 150 may be configured to route the authorization request for a transaction to the issuer computer 170 via the payment processing network computer 160 and route an authorization response received via the payment processing network computer 160 to the merchant computer 140.

The payment processing network computer 160 may be configured to provide authorization services, and clearing and settlement services for payment transactions. The payment processing network computer 160 may include data processing subsystems, wired or wireless networks, including the internet. An example of the payment processing network computer 160 includes VisaNet™, operated by Visa®. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. The payment processing network computer 160 may include a server computer. In some implementations, the payment processing network computer 160 may forward an authorization request received from the acquirer computer 150 to the issuer computer 170 via a communication channel. The payment processing network computer 160 may further forward an authorization response message received from the issuer computer 170 to the acquirer computer 150.

The issuer computer 170 may represent an account issuer and/or an issuer processor. Typically, the issuer computer 170 may be associated with a business entity (e.g., a bank) that may have issued an account and/or payment card (e.g., credit account, debit account, etc.) for payment transactions. In some implementations, the business entity (bank) associated with the issuer computer 170 may also function as an acquirer (e.g., the acquirer computer 150).

An authorization computer (e.g., a payment processing network computer 160 or the issuer computer 170) may be configured to authorize split shipment authorization requests using techniques discussed herein. For instance, an authorization computer may be configured to recognize a split shipment authorization request (e.g., based on a split shipment indicator) and perform validations of the split shipment authorization request. The validation may include verifying linking data included in the split shipment authorization request (e.g., using a shared secret or shared algorithm). Additionally, the validation may include validating the split shipment amount according to one or more predefined split shipment validation rules. For example, one rule may specify that the total amount of all split shipments may not exceed the original total order amount by more than 15%. The split shipment rules can include general rules that are applicable to all split shipments and/or customized rules for specific transactions, accounts, merchants, issuers, and the like.

Figure 2:
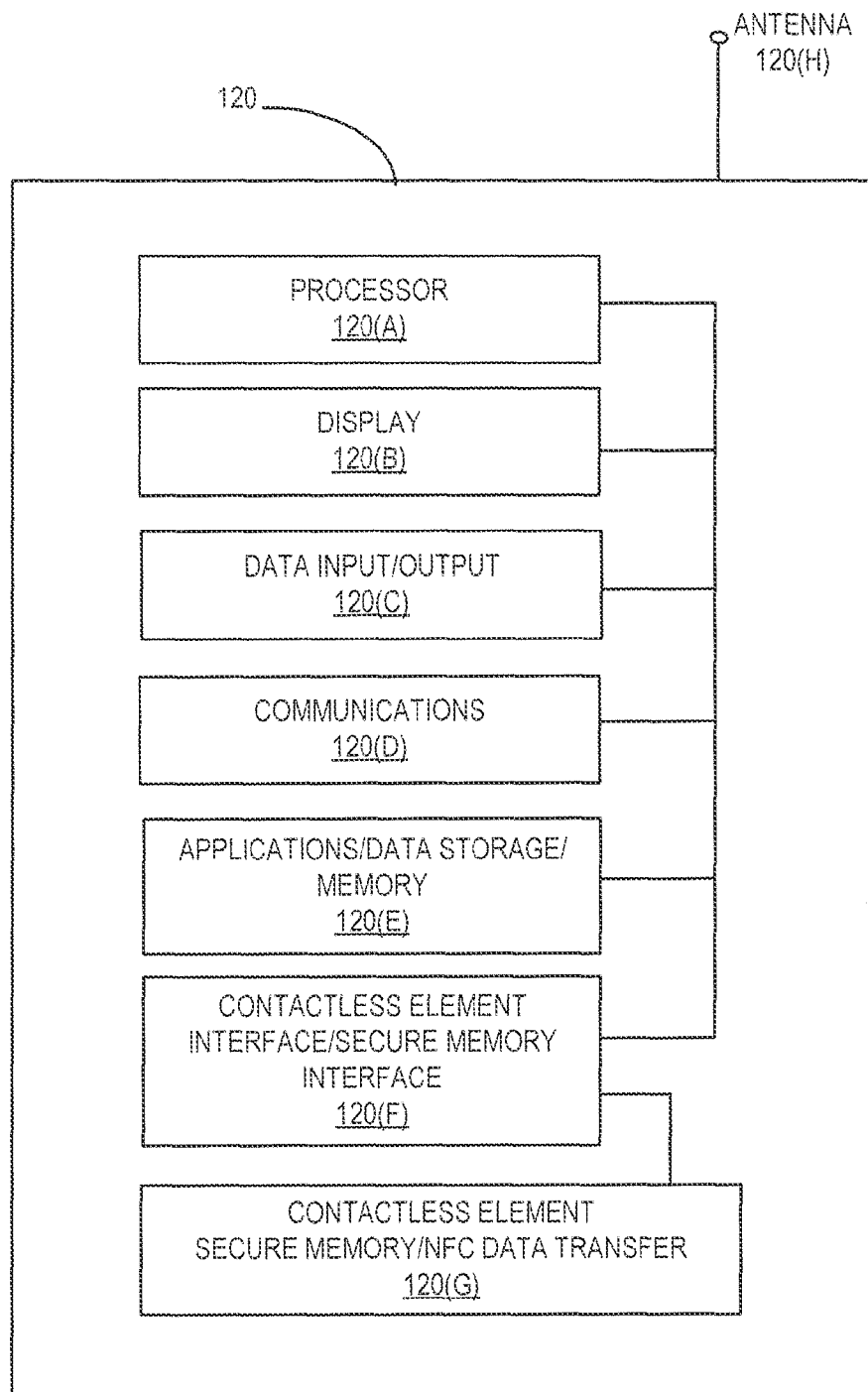
FIG. 2 shows a block diagram of an exemplary communication device, in accordance with some embodiments.

FIG. 2 shows a block diagram of an exemplary communication device (e.g., consumer device 120), in accordance with some embodiments. Consumer device 120 may include circuitry that is used to enable certain device functions, such as telephony. The functional elements responsible for enabling those functions may include a processor 120(A) that is programmed to execute instructions that implement the functions and operations of the device. Processor 120(A) may access data storage 120(E) (or another suitable memory region or element) to retrieve instructions or data used in executing the instructions, such as merchant applications, remote transaction application 124, or other mobile applications. Data input/output elements 120(C), such as a keyboard or touchscreen, may be used to enable a user to operate the consumer device 120 and input data (e.g., user authentication data). Data input/output elements may also be configured to output data (via a speaker, for example). Display 120(B) may also be used to output data to a user. Communications element 120(D) may be used to enable data transfer between consumer device 120 and a wired or wireless network (via antenna 120(H), for example) to assist in connectivity to the Internet or other communications network, and enabling data transfer functions.

Consumer device 120 may also include contactless element interface or secure memory interface 120(F) to enable data transfer between contactless element 120(G) and other elements of the device, where contactless element 120(G) may include a secure memory and a near field communications data transfer element (or another form of short range or contactless communications technology). As noted, a cellular phone or similar device is an example of a communication device (e.g., consumer device 120) that may be used in accordance with embodiments of the present invention. However, other forms or types of devices may be used without departing from the underlying concepts of the invention. Further, devices may not require the capability to communicate using a cellular network in order to be suitable for use with embodiments of the present invention.

Figure 3:
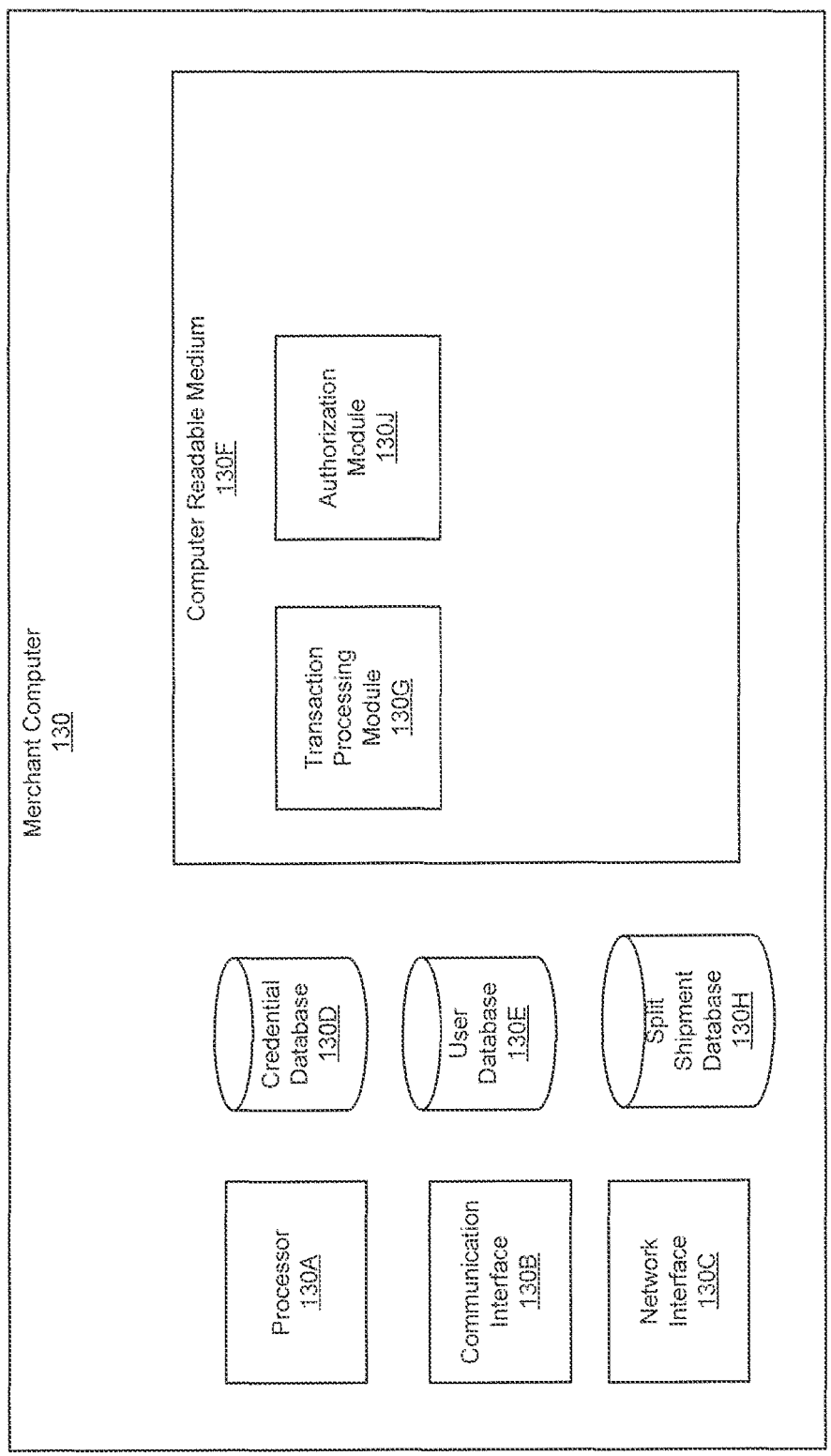
FIG. 3 illustrates components of a merchant computer 140, in accordance with embodiments.

FIG. 3 illustrates components of a merchant computer 140, in accordance with embodiments. The merchant computer 140 may include a processor 130A communicatively coupled to a network interface 130C, a credential database 130D, a user database 130E, a split shipment database 130H, and a computer readable medium 130F.

The computer readable medium 130F may be in the form of a memory (e.g., flash, ROM, etc.) and may comprise code, executable by the processor 130A for implementing methods described herein. For example, the computer readable medium 130F may include a transaction processing module 130G, an authorization module 130J, and any other suitable module.

The transaction processing module 130G may comprise code that causes the processor 130A to process transactions. For example, the transaction processing module 130G may contain logic that causes the processor 130A to receive payment credentials (e.g., a primary account number (PAN) or a payment token) from the user 120 for a transaction. In some embodiments, the merchant computer 130 may store a payment credentials associated with the user 120 (e.g., at the credential database 130D), and the transaction processing module 130G may identify the payment credentials associated with the user or user account when the user 120 initiates a purchase. The transaction processing module 130G may be able to initiate transaction authorization (using either received payment credentials or an identified payment token), and may also be able to finalize a transaction so that goods and/or services can be released.

The authorization module 130J may comprise code that causes the processor 130A to send and receive authorization messages. For example, the authorization module 130J may contain logic that causes the processor 130A to generate an authorization request message including payment credentials (e.g., a payment token, token code, domain ID, name, etc.), transaction data, and any other relevant information such as security information including security value(s) and/or authentication response value(s). The authorization request message may be sent to the acquirer computer 135. An authorization response message from the acquirer computer 135 can also be received and processed.

The authorization module 130J may comprise code that causes the processor 130A to send and receive split shipment authorization messages. For example, the authorization module 130J may contain logic that causes the processor 130A to generate a split shipment authorization request message for a split shipment of a single order. The split shipment authorization request message may comprise a split shipment indicator, a split shipment amount, a total order amount, linking data, and other relevant information such as discussed above. The linking data may be reused in subsequent split shipment authorization requests so as to link them to the same single order. The linking data may be generated based on information used in authorization for one of the split shipments associated with a single order. For instance, the linking data may be generated based on authorization information used for the first or initial split shipment. The linking data can include information from an authorization request, an authorization response, or both. For instance, the linking data may include security information and/or authentication response value that is sent as part of the initial split shipment authorization request. Likewise, linking data can be extracted from a split shipment authorization response message.

The authorization module 130J may be configured to communicate with a split shipment database 130H to store and/or retrieve information related to split shipment processing. The split shipment database 130H may be configured to store linking data associated with orders as discussed above. All split shipment authorization requests associated with a single order share the same linking data. The linking data may be identified by order identifying information that uniquely identifies a particular order. Order identifying information may include an order identifier, merchant information, payment information, transaction information (e.g., transaction ID), or any combination thereof. Such linking data may be updated with data used in a split shipment authentication request message and/or data extracted from a split shipment authentication response message. The linking data may also be retrieved and used in a split shipment authentication request message.

In some embodiments, the linking data may be tokenized, for example, to provide increased security. A token representing linking data can be stored and managed by a token issuer such as discussed in FIG. 11. For example, the merchant computer may request a token representing the linking data from a token issuer and use it in a split shipment authorization request. An authorizing entity such as a payment processing network computer or an issuer computer may validate the split shipment authorization request by retrieving the underlying linking data based on the token included in the authorization request.

The processor 130A can comprise a CPU, which comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques.

The network interface 130C may be configured to allow the merchant computer 130 to communicate with other entities such as the consumer device 120, supplier computers 135A and B, acquirer computer 150, payment processing network computer 160, issuer computer 170, and the like, using one or more communications networks. Network interfaces may accept, communicate, and/or connect to a communications network. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Figure 4:
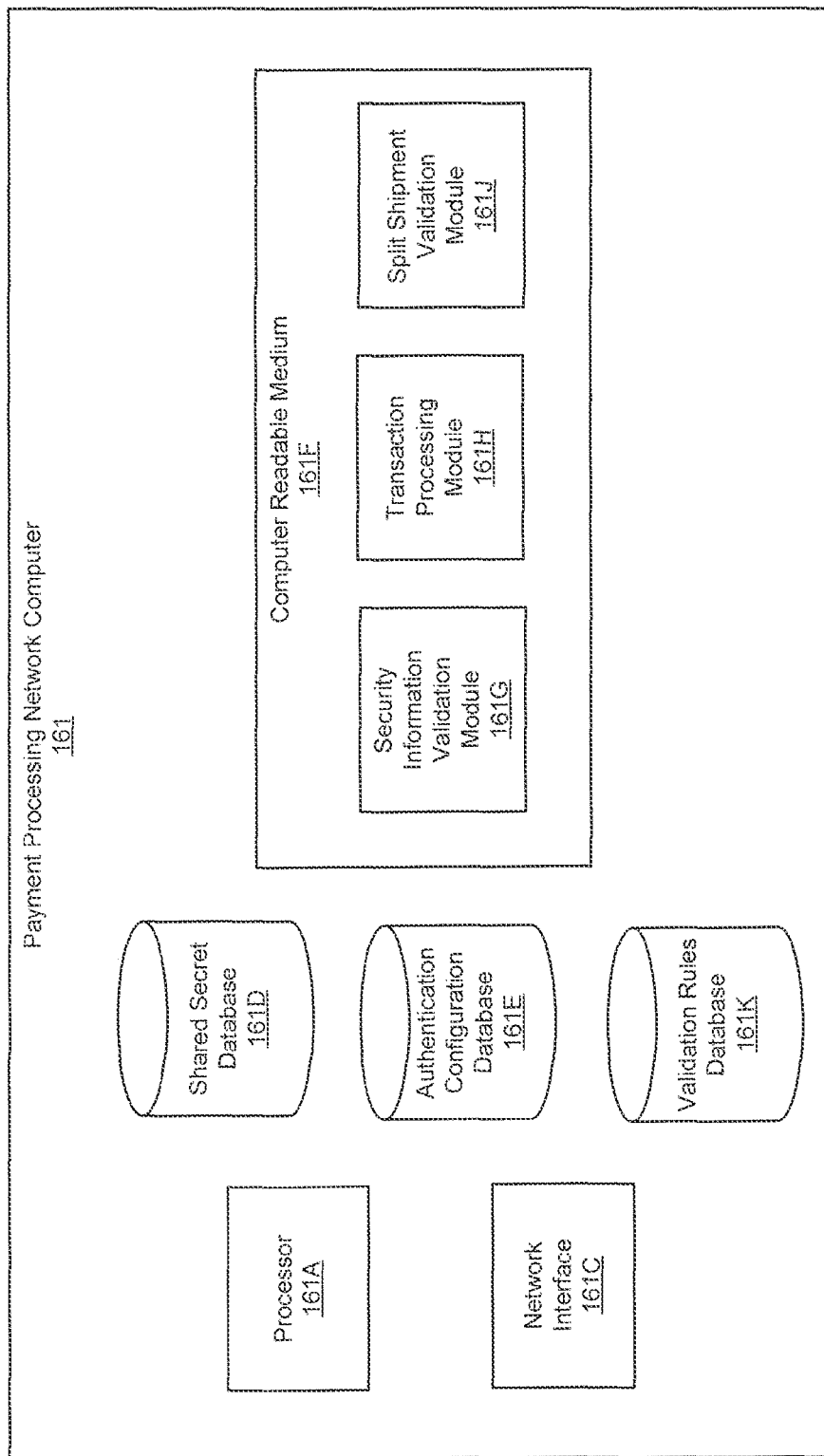
FIG. 4 illustrates components of a payment processing network server computer 161, in accordance with embodiments.

FIG. 4 illustrates components of a payment processing network server computer 161, in accordance with embodiments. The server computer 161 may be part of the payment processing network 160 illustrated in FIG. 1. The server computer 161 may include a processor 161A communicatively coupled to a network interface 161C, a shared secret database 161D, an authentication configuration database 161E, a validation rules database 161K, and a computer readable medium 161F.

The computer readable medium 161F may be in the form of a memory (e.g., flash, ROM, etc.) and may comprise code, executable by the processor 161A for implementing methods described herein. For example, the computer readable medium 161F may include a security information validation module 161G, a transaction processing module 161H, a split shipping validation module 161J, and any other suitable module.

A security information validation module 161G may include any software module that is configured to validate security information or authentication data (e.g., user authentication data, security values, or any other authentication information) associated with a payment request or authorization request. The validation of security information may be performed before an authorization request is initiated. For example, the security information validation module 161G may be configured to determine an authentication computer associated with an authentication request and forward the authentication request to the relevant authentication computer.

An authentication computer may include any computer, system, device, or combination of devices configured to receive authentication requests including security information associated with a remote payment transaction, validate the security information, and provide an authentication response value indicating that the security information has been validated and/or authenticated. Authentication computers may include an authentication database including personal information, usernames, passwords, PINs, passcodes, shared secrets, and any other relevant information to allow a system to authenticate a user has authorization or permission to perform a transaction.

The authentication computer may be associated and/or operated by the payment processing network 160, by the issuer, or by a third party. For example, the account issuer may provide issuer profile information (e.g., authentication rules, risk rules, etc.) and shared secrets associated with account holders, devices, and any other relevant information to a payment processing network 160 or other third party computer system to allow for the payment processing network or other entities to perform the authentication of the security information. Such a system may be considered as an on-behalf-of authentication system where the issuer has provided authentication information to a third party to allow for the authentication functionality to perform by the third party on-behalf-of the issuer. An authentication computer that is associated or managed with an account issuer may be considered an access control server (ACS).

In some embodiments, the authentication computer may also include the issuer computer 170 associated with authorization decision processing as well. Accordingly, in some embodiments, the payment processing network 161 may send authentication requests to an issuer computer 170 in a similar manner to payment transaction processing (e.g., through the use of ISO messages or other pre-configured interfaces with an issuer computer).

Further, in some embodiments, more than one authentication computer may be used during a remote transaction authentication process. For example, a payment processing network 160 may perform device authentication on-behalf-of an account issuer through the account issuer sharing a shared secret associated with the account with an on-behalf-of authentication computer operated by the payment processing network 160. However, the account issuer may not provide consumer profile information and corresponding user authentication data with the payment processing network 160 and instead, the user authentication data may be passed to an issuer authentication computer, access control server (ACS), or other computer configured to authenticate consumer information. Accordingly, the payment processing network 160 may validate the device authentication information in parallel or in combination with the access control server (ACS) of the issuer validating the user authentication data.

Additionally, in some embodiments the payment processing network authentication computer may pass authentication results to the account issuer access control server computer (i.e., authentication computer associated with an issuer). For example, the security information passed to the authentication computer may include an indication that the security value (e.g., cryptogram) and/or the user authentication data (e.g., passcode) was previously authenticated by the payment processing network 160 on-behalf-of the account issuer 170. Accordingly, in some embodiments, an authentication computer associated with an account issuer 170 may participate in the generation of an authentication response value or other indication of authentication of the consumer and/or device, without performing the direct validation of the security information. Further, in some embodiments, the roles may be reversed with an authentication computer associated with the payment processing network 160 generating the authentication response value based on the validation of the security information by an authentication computer associated with an account issuer 170.

An authentication computer may use shared secrets or shared algorithms to validate a security value that uses repeatable input data to re-calculate and compare a dynamic security value (e.g., cryptogram) for a transaction. For example, the security value (e.g., cryptogram) may be generated by a consumer device using an account identifier, expiration date, transaction time, transaction amount, or any other suitable transaction information that may be available to both the consumer device and the authentication computer associated with the account issuer computer 170 and/or payment processing network 160 (or any other processing entity). For example, an algorithm may be shared between the consumer device and the authentication computer associated with the payment processing network 160 or account issuer computer 170 or other processing entity in order to allow for validation of the security information.

In some embodiments, the security information validation module 161G may forward an authentication request to a directory server computer associated with the payment request, which may then forward the authentication request to the appropriate authentication server. In other embodiments, the functionality of the directory server may be incorporated into the payment processing network 160 such that the payment processing network 160 may determine an appropriate authentication computer based on information included in the authentication request. For example, the payment processing network computer may determine an authentication computer associated with the authentication request by parsing account credentials (e.g., a primary account number, a token or account substitute, etc.) from the authentication request and determining an issuer associated with the account credentials. For instance, in some embodiments, the authentication request may include a primary account number (PAN) or payment token associated with a payment transaction and the PAN or token may include a portion (e.g., a bank identifier (BIN) that identifies an issuer of the account. Accordingly, the security information validation module 161G may compare the BIN to an authentication configuration database 161E to determine an authentication computer associated with the issuer's account. Furthermore, the issuer may have certain accounts authenticated by different authentication computers and thus, in some embodiments, the directory server may determine an authentication computer associated with an account range or account number associated with the issuer.

An authentication configuration database 161E may include any information relevant to determining an authentication computer associated with an account and/or account issuer. The authentication configuration database 161E may also include authentication preferences associated with issuers and profile information for risk assessment, transaction processing, authorization decisions, etc., associated with an account issuer. Furthermore, the authentication configuration database 161E may be found at the payment processing network 160 or at the directory server depending on the configuration options of the system.

A shared secret database 161F may include any information that allows an entity to validate security information and/or other authentication information associated with an issuer account. For example, in some embodiments, the shared secret database may include shared secret algorithms for re-generating security values associated an account or may include a searchable database of relevant consumer authentication and device authentication information. The shared secret may include an algorithm, a look-up table, or any other information associated with an account, device, and/or mobile payment application provided by the account issuer during provisioning of the account on the consumer device. Additionally or alternatively, a master shared secret key may be provided by the account issuer that may be used to generate a derived shared secret key for each account associated with the issuer. Either way, the security information validation module 161(D) of the payment processing network 160 may retrieve the appropriate shared secret associated with the authentication request, determine a security value for the authentication request, and compare the determined security value to the received security value to validate the consumer device or mobile payment application as authentic and verified.

The security information validation module 161G may be configured to generate and/or validate an authentication response value using a secret algorithm securely stored at the payment processing network 160 and the secret algorithm may not be shared with any other entities in the transaction processing system. Accordingly, the security information validation module 161G may validate a dynamic cryptogram generated by a consumer device 120 (e.g., security value) and/or user authentication data (e.g., passcode entered by a user) and may return another dynamic cryptogram (e.g., authentication response value) that may be returned to the consumer device 120 and submitted with any authorization request message that is generated for the transaction. Subsequently, the payment processing network 160 may obtain the authentication response value during the transaction processing of the authorization request message and may validate that the authentication response value matches the generated authentication response message originally generated by the payment processing network 160 during the initial processing of the payment transaction. Accordingly, the payment processing network 160 may be assured that the transaction has not been altered and that the transaction data is the same as the transaction that was originally authenticated by the payment processing network computer 161. In some other embodiments, the authentication request may be validated by and the authentication response value may be generated by an authentication computer instead of the payment processing network. Regardless, the authentication response value may be validated by the account issuer computer 170 or the payment processing network 160 during authorization processing in order to provide an additional level of authentication for the transaction by indicating that the transaction was previously analyzed and authenticated.

The security information validation module 161G may be configured to generate an authentication response value (e.g., a CAVV or TAVV) for an initial split shipment transaction. Subsequently, the authentication response value may be used as part of the linking data that is used by one or more split shipment authorization requests associated with a single order. The security information validation module 161G may be configured to validate an authentication response value to ensure that they match the matches the generated authentication response message originally generated by the payment processing network 160 during the initial authentication process. The authentication response value may be generated by an authentication computer that may or may not be associated with a payment processing network. The linking data may also include authorization response data that is extracted from one or more split shipment responses. Such authorization response data may be provided by an issuer or the payment processing network. The authorization response data that is included in the linking data may also be validated by the security information validation module 161G or an issuer computer similar to the validation of the authentication response value, discussed above.

A transaction processing module 161H may include any software module that is configured to receive an authorization request message and process the authorization request message for a transaction. For example, the transaction processing module 161H may be configured to perform additional risk and/or fraud analysis based on information included in the authorization request and/or additional information received in the past and/or from other sources to determine whether an authorization request should be approved. For split shipment authorization requests, the decision to approve or decline the authorization requests may also depend on the validation of the linking data and/or additional validation according to predefined split shipment rules.

A split shipment validation module 161J may include any software module that is configured to validate a split shipment authorization request according to one or more predefined split shipment rules. The split shipment rules may be stored in the validation rules database 161K or any suitable data store. The split shipment rules may be defined by the payment processing network, an issuer, an acquirer, a merchant, or an account holder. The split shipment rules may specify conditions for approving and/or declining a split shipment authorization request. For instance, the split shipment rules may specify an upper limit for a total amount of all split shipments associated with a single order, an account, a merchant, or any combination thereof. If the upper limit is reached and/or exceeded, the authorization may be declined. The upper limit may be expressed as an absolute amount or relative to the originally declared total order amount. For example, a rule may specify that the total amount of all split shipments may not exceed $10,000. As another example, the rule may specify that the total split shipment amounts may not exceed $1000 or 15% over the originally declared total order amount. To validate such a rule, the split shipment validation module 161J may be configured to keep track of a running total split shipment amount that has been authorized and/or cleared so far. When a new split shipment authorization request comes in, the split shipment amount may be added to the running total split shipment and the result is checked against the rule to ensure that the rule is not violated. For example, given a rule that specifies an upper limit of 15% of original order amount of $100, a first split shipment amount of $60 and a second split shipment amount of $35 may each be authorized because $60 and $95 ($60+$35) is less than $115 but a third split shipment amount of $25 may be declined because $120 ($95+$25) exceeds the upper limit of $115.

In various embodiments, the split shipment rules may be based on any information that may be derived from the authorization requests such as the split shipment amount, the total order amount, transaction information, merchant information, and the like. For example, the split shipment rules may specify a maximum number of split shipments that can be made for a single order (e.g., 10), a maximum frequency or minimal intervals at which split shipment authorization requests may be made (e.g., once a day), a maximum or minimum amount of individual split shipment amount (as an absolute amount or as a percentage of the original order amount), and the like. In various embodiments, the split shipment rules may include general rules that are applicable to all split shipments and/or customized rules for specific transactions, accounts, merchants, issuers, and the like. For example, a user interface may be provided for a user (e.g., issuer) to specify customized split shipment validation rules.

Figure 5:
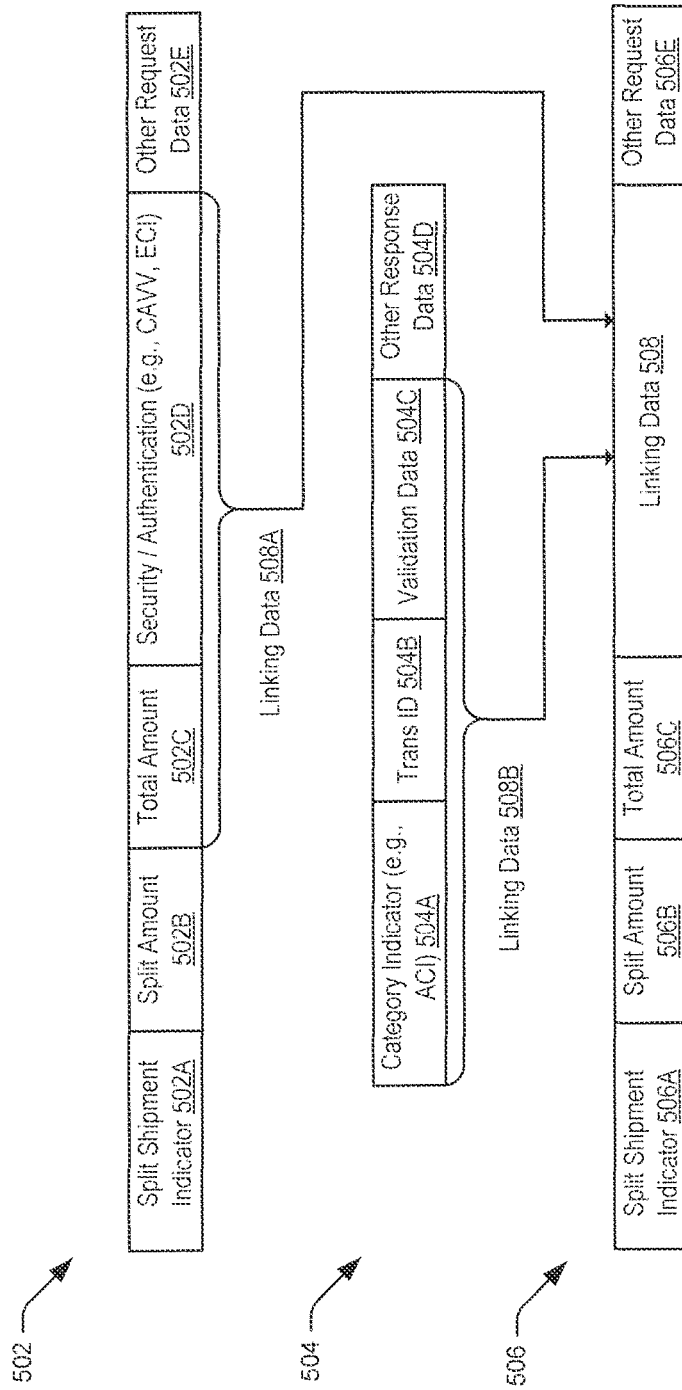
FIG. 5 illustrates exemplary data fields or fields in split shipment authorization messages, in accordance with embodiments.

FIG. 5 illustrates exemplary data elements or fields in split shipment authorization messages, in accordance with embodiments. The split shipment authorization messages can include authorization request messages and authorization response messages that comply with ISO 8583 or any other suitable format. Furthermore, additional fields may be provided to facilitate the processing of split shipment transactions.

An initial split shipment authorization request 502 can be provided for the initial (or the very first) split shipment of an order involving split shipments. The initial split shipment authorization request 502 can include a split shipment indicator 502A, a split shipment amount 502B, a total order amount 502C, security/authentication data 502D, and other authorization request data 502E.

The split shipment indicator 502A can be used to indicate that the associated authorization request is for an initial or the very first split shipment of a plurality of split shipments. Hence, the split shipment indicator 502A can include a special value (e.g., "0") that is distinguishable from the split shipment indicators of all subsequent split shipments of the plurality of split shipments. Alternatively, the split shipment indicator 502A can be used to indicate that the associated authorization request is one of a plurality of split shipments. Hence, the split shipment indicator 502A may not be distinguishable from the split shipment indicators of subsequent split shipments of the plurality of split shipments. In some embodiments, the split shipment indicators may indicate a sequence or order in which the split shipment authorization requests are generated and/or sent. For instance, the split shipment indicator can include a sequence number that is incremented for each subsequent split shipment. In other embodiments, the split shipment indicators may not indicate a sequence or order in which the split shipment authorization requests are generated and/or sent.

The split shipment amount 502B can include a transaction amount that needs to be authorized for a split shipment associated with an order. The split shipment amount is typically less than the total amount associated with an order. For example, if the order includes ten books at $10 each, and the initial split shipment includes six books, then the split shipment amount for the initial split shipment would be $60 out of the total amount of $100.

The total order amount 502C can include the amount associated with the entire order. In the example above, the total order amount would be $100 for ten books included in the order.

The security/authentication data 502D can include security information that may be used to authenticate or validate a party, device, process, data, or transaction. The security/authentication data 502D can also include authentication response data may be used to inform an entity that data, an entity, or a process has been previously authenticated. Additionally, the security/authentication data 502D can include a security level indicator (e.g., an Electronic Commerce Indicator (ECI)) that indicates the level of security used when a cardholder provided payment information to the merchant. The security level indicator may be set to a value corresponding to the authentication results and the characteristics of the merchant checkout process. In some embodiments, the security/authentication data 502D may include only security information, only authentication response data, only security level indicator, or a combination of any of the above. For instance, in an example, the security/authentication data 502D includes only an authentication response value (e.g., CAVV) and a security level indicator (e.g., ECI). In another example, the security/authentication data 502D may include security values such as CVV, CVV2 and/or dCVV. In various embodiments, the security/authentication data 502D may be generated by any suitable entities such as a consumer device, an authentication computer, a merchant computer, an issuer, an acquirer, a payment processing network computer, and the like.

In some embodiments, security information may include user authentication data in order to authenticate a user of a device, an account holder, or a consumer associated with an account or transaction. Additionally, security information may include a security value associated with a device, account, or account issuer.

User authentication data may include any information that may be used to validate the identity or permissions of a user. For instance, the user authentication data may include a personal identification number (PIN), passcode, password, username, or any other secret information that is shared between trusted parties in order to validate the identity of one or more parties. For instance, in some embodiments, user authentication data may include one or more of a personal identification number (PIN), a passcode, a password, a biometric identifier, or any other unique user information that may be shared and validated by another party. Additionally, the user authentication data may include an indication of a previously authenticated user (e.g., the results of a biometric validation of a user).

A security value may include any information that may be used to authenticate a device, account, process, or application as being authentic. The security value may include a static value or a dynamic value. Further, the security value may be generated using a shared secret or other algorithm that may be validated by another entity or system. For example, a security value may include a dynamic value that may change over time (e.g., periodically), change per use (e.g., per transaction), and/or change based on received information (e.g., input information to an algorithm) and may be validated by a system that also has access to a shared algorithm and input data to re-create and validate the security value. For instance, a security value may change every time a transaction is initiated and may be generated using a shared secret algorithm or other shared information between two entities such that one entity may validate that the other entity has access to the shared secret and is thus, authentic.

In some embodiments, the security value may include a cryptogram. For example, a cryptogram may be generated per transaction based on a derived algorithm that is specific to a consumer device and/or issuer account and may be validated at a payment processor or an issuer of the account for each transaction. Such dynamic values may be referred to as dynamic card verification values (e.g., dCVV, dCVV2), unique authentication verification values (UAVV), token authentication verification value (TAVV), etc., and may be distinguished based on the input data and the algorithm used to generate the verifiable dynamic values. For example, a token authentication verification value may use a token (or other account substitute) as an input to a verification algorithm while a dynamic card verification value may use a primary account number (PAN) as an input to the same or a different verification algorithm.

In other embodiments, a secret algorithm used to generate a security value may be known by a single entity. For example, in some embodiments, a remote transaction may be authenticated before an authorization request message is generated and an issuer or a payment processing network may generate an authentication response value using a secret algorithm. When the transaction is initiated and the authorization request message is generated, the authentication response value may be included in the authorization request message and the payment processing network or account issuer may validate the authentication response value using the same secret algorithm and input data to validate the transaction. Accordingly, security values may include cryptograms generated using shared keys (e.g., dynamic verification values, token authentication data, etc.) or secret keys (e.g., authentication response values).

In some embodiments, a payment processing network and/or issuer computer 170 may authenticate security information before receiving an authorization request message for a payment transaction. In such embodiments, a payment processing network and/or issuer computer may return an authentication response including an authentication response value indicating validation of the authentication information if the authentication information is authenticated and/or validated. Accordingly, a remote transaction processor (e.g., payment processing network computer, mobile gateway, remote key manager computer, etc.) may substitute the authentication information with the authentication response value in the payment information before re-encrypting the payment information and sending to the transaction processor for initiation of the payment transaction. Thereafter, the authentication response value may be returned to the payment processing network in order to inform the transaction entity that the payment transaction was previously authenticated. Such systems increase the security of transaction processing systems and minimize the chances that the transaction is fraudulent since multiple authentication processes occur at various times during the transaction processing. Additionally, such systems can efficiently authenticate both users and payment devices before a transaction is submitted through a payment processing network and through a single authentication process.

An authentication response value may include any data that informs an entity that data, an entity, or a process has been authenticated. For example, an authentication response value may be generated similarly to the security value explained above but may be generated using a different shared secret or algorithm such that another entity within the transaction processing eco-system that has access to the shared secret may determine that the message, account, or other information included in the message has been authenticated by an entity. For instance, particular static data elements (e.g., account identifier, expiration date, transaction time, date, etc.) associated with a transaction may be used as inputs to generate an authentication response value during an authentication process and the calculation may be repeated (using the same data elements) during the payment phase after receiving the authorization request message, to validate that the authentication response value is correct and associated with the same transaction information. Examples of an authentication response value may include a cardholder authentication verification value (CAVV), a token authentication verification value (TAVV), and the like.

To facilitate split shipment processing, in some embodiments, the security/authentication data 502D may be generated based at least in part on data elements specific to a split shipment transaction (e.g., total order amount, transaction ID). For instance, a split shipment amount, total order amount, a PAN or payment token, along with any other transaction information may be used as inputs to generate an authentication response value (e.g., CAVV or TAVV).

The initial split shipment authorization request 502 can also include other authorization request data 502E such as transaction information other than the amounts (e.g., time, location, transaction ID), payment information (e.g., account identifier, cardholder name, expiration date, service code), and the like. In some embodiments, the other authorization request data 502E can include information typically present in "card-present" transaction such as payment credentials, transaction information (e.g., transaction ID), security values, and the like.

Still referring to FIG. 5, a split shipment authorization response 504 may be provided that corresponds with the initial split shipment authorization request 502. The split shipment authorization response 504 can include a category indicator 504A (e.g., Authorization Characteristics Indicator (ACI)), payment processing transaction ID 504B, validation data 504C, and other response data 504D.

The category indicator (e.g., ACI) 504A may indicate a specific service category or program that the associated transaction qualifies for. The category indicator may be provided by a payment processing network computer 160 including VisaNet™ operated by Visa®. Alternatively, the category indicator may be provided by an issuer.

The payment processing transaction ID 504B may include a unique identifier that identifies the transaction within a payment processing network such as the VisaNet™, operated by Visa®.

The validation data 504C may include a digital signature, cryptogram, or other value that is generated based at least in part on the data in the corresponding authorization request such the authentication response value (CAVV or TAVV), total order amount, security level indicator (ECI), transaction ID, and the like. In an example, such data may be used as inputs to a secret or shared algorithm to generate the validation data 504C. Alternatively or additionally, the validation data 504C may be generated based on data from the authorization response such as the category indicator 504A. In various embodiments, the validation data 504C may be provided by a payment processing network computer and/or an issuer computer and used to proof that authorization of a particular authorization request (e.g., with specific CAVV, total amount, ECI, and transaction ID) has occurred.

The split shipment authorization response 504 can also include other authorization response data 504D such as status indicators (e.g., Approval—transaction was approved; Decline—transaction was not approved; or Call Center—response pending more information, merchant must call the toll-free authorization phone number). The authorization response message may also include an authorization code, which may be a code that a credit card issuing bank returns in response to an authorization request message in an electronic message (either directly or through the transaction processing network) to the merchant's access device (e.g. POS equipment) that indicates approval of the transaction. The code may serve as proof of authorization. In some embodiments, the authorization code may be different than the validation code 504C discussed above. For instance, the authorization code may be provided by an issuer whereas the validation code 504C may be provided by a payment processing network. In some other embodiments, the authorization code may include or be included in the validation code 504C.

One or more validation results of the security/authentication data of the authorization request may also be provided in an authorization response. For instance, the result of validation of a CAW provided as part of the authorization request may be returned in the authorization response. In the context of split shipment processing, the result of validation of the linking data (discussed below) may be provided in the authorization response. Additionally, the result of validation of split shipment specific logic according to predefined split shipment rules (discussed above) may be provided.

Certain data elements from the initial split shipment authorization request 502 and/or the corresponding split shipment authorization response may be extracted and used as linking data in a subsequent split shipment authorization request 506. The subsequent split shipment authorization request 506 can include a split shipment indicator 506A, split shipment amount 506B, a total order amount 506C, linking data 508, and other authorization request data 506E. The split shipment indicator 506A may be used to indicate that the associated authorization request is for a subsequent (non-initial) split shipment of a plurality of split shipments. Alternatively, the split shipment indicator 506A can be used to indicate that the associated authorization request is one of a plurality of split shipments. Hence, the split shipment indicator 506A may not be distinguishable from the split shipment indicators of previous or subsequent split shipments of the plurality of split shipments. In some embodiments, the split shipment indicators may indicate a sequence or order in which the split shipment authorization requests are generated and/or sent. For instance, the split shipment indicator can include a sequence number that is incremented for each subsequent split shipment. In other embodiments, the split shipment indicators may not indicate a sequence or order in which the split shipment authorization requests are generated and/or sent.

The split shipment amount 506B can include a transaction amount that needs to be authorized for the associated split shipment, similar to the split shipment amount 502B of the initial split shipment authorization request 502. The total order amount 506C can include the amount associated with the entire order, similar to the split shipment amount 502C of the initial split shipment authorization request 502.

The linking data 508 can be used to link a subsequent authorization request to the original order. In some embodiments, the linking data 508 can contain information that links to the initial split shipment authorization. For example, the linking data 508 can be generated based on linking data 508A derived from data included in the initial split shipment authorization request 502, linking data 508B derived from data included in the corresponding split shipment authorization response 504, or both. In an embodiment, the link data 508A can be generated based on the total order amount 502C and the security/authentication data 502D (e.g., CAVV and ECI) of the initial split shipment authorization request 502. Alternatively or additionally, the linking data 508A may be generated based on any other suitable data elements of the authorization request 502 such as split shipment amount 502B and other request data 502E. In an embodiment, the link data 508B can be generated based on the category indicator 504A (e.g., ACI), the payment processing transaction ID 504B, and the validation value 504C of the split shipment authorization response 504. Alternatively or additionally, the linking data 508B may be generated based on any other suitable data elements of the authorization request 504 such as other response data 502E.

The linking data 508A and linking data 508B may be processed in any suitable manner before being used to generate the linking data 508. For instance, the linking data 508A and/or 508B may be encoded, encrypted, decoded, decrypted, truncated, scrambled, modified, masked, or otherwise processed. In some embodiments, the linking data 508A and/or linking data 508B may be used as is without any modification. The linking data 508A and linking data 508B may be combined in any suitable manner to generate the linking data 508. For instance, the linking data 508A and linking data 508B may be concatenated to form the linking data 508. The linking data 508 may be stored in one data element or field of the authorization request 506. Alternatively, the linking data 508 may be stored in more than one data elements or fields of the authorization request 506.

The linking data 508 may be validated as part the authorization process for the split shipment authorization request 504. For example, one or more secrets or shared algorithm may be used to validate various portions of the linking data 508 similar to the validation of security information and authentication response values discussed herein. The linking data 508 may be considered invalid if any portion of the linking data 508 is not validated using the validation secrets or algorithms. If the validation of the linking data 508 fails, the split shipment authorization request 504 may be declined.

Besides validation of the linking data 508, additional validations specific to split shipment processing may be performed. For instance, the split shipment amount 506B may be validated against the total amount 506C according to one or more predefined split shipment validation rules associated with the particular order, account, merchant, or the like. For instance, a running total of all the authorized split shipments may be maintained to ensure that the total does not exceed the original order amount by more than a certain percentage (e.g., 15%).

Validation of the split shipment authorization request 504 may be performed by any authorizing entity or entities such as a payment processing computer and/or an issuer computer. Where multiple authorizing entities are involved, each authorizing entity may be configured to validate a different portion of the split shipment authorization request 504 or to apply different validation methods to the same portion of the split shipment authorization request 504. For instance, a first authorizing entity may be configured to validate the CAVV and ECI of the linking data whereas a second authorizing entity may be configured to validate ACI and validation value of the linking data. As another example, a first authorizing entity may be configured to validate the linking data of the authorization request whereas a second authorizing entity may be configured to validate the authorization request according to the split shipment specific validation rules.

As illustrated in FIG. 5, the initial split shipment authorization request 502 can be considered a dual-purpose authorization request. On the one hand, the initial split shipment authorization request 502 can be used to obtain authorization for the split shipment amount 502B. On the other hand, the initial split shipment authorization request 502 can be used to declare the total order amount such that the returned linking data in the authorization response 504 (e.g., linking data 508B) captures the total order amount. For instance, the validation data 504C can include a digital signature that is generated based on data elements of the authorization request 502 including the total order amount and any other suitable data elements. Using a single authorization request 502 to obtain both authorization and linking data can increase efficiency of payment processing.

In alternative embodiments, the single dual-purpose authorization request discussed above may be implemented by two separate authorization requests to achieve the same results. For example, a first dummy split shipment authorization request may be generated for the only purpose of declaring the total order amount and/or obtaining linking data for subsequent actual shipment authorization requests. For example, the first split shipment authorization request may include a zero amount as the split shipment amount and the total order amount in the secondary amount field. In response to the first authorization request, an authorization response may be provided that includes the linking data required for subsequent split shipment authorization requests (e.g., the validation value). Subsequently, split shipment authorization requests may be generated for the actual split shipments with non-zero authorization amounts, using the linking data that is obtained by the dummy split shipment authorization request.

In various embodiments, any suitable data can be used as linking data to link split shipments to the original purchase order. The linking data may be provided by one or more authenticating entities and/or authorizing entities (e.g., a payment processing computer or an issuer computer). In some embodiments, such as illustrated in FIG. 5, the linking data may include verifiable information from a split shipment authorization data (e.g., data extracted from the initial split shipment authorization request message and/or response message). In some other embodiments, the linking data may not be directly tied to a particular split shipment authorization request and/or response. Instead, the linking data may simply be a value or identifier that is assigned by an authorizing entity that uniquely identifies original purchase order.

In some embodiments, at least a portion of the linking data may be stored by a merchant computer so as to generate split shipment authorization requests. In some other embodiments, at least a portion of the linking data may be stored at a data storage service accessible by the merchant computer. The storage service may be provided, in an example, by an acquirer. At least a portion of the linking data may be retrieved using linking data identifiers assigned by the service provider.

In some embodiments, a least a portion of the linking data may be tokenized in a similar manner as the tokenization of PANs to increase a level of data security. For instance, a merchant computer may request and obtain a token for linking data associated with a given order from a token issuer configured to store, manage, and issue manage tokens for linking data. The obtained token may be inserted as linking data in a split shipment authorization request, which may be forwarded to an acquirer computer, a payment processing network computer, and eventually an issuer computer. As part of the authorization process, the acquirer computer, the payment processing network computer, and/or the issuer computer may obtain the underlying linking data from the token issuer using the token associated with the linking data. An exemplary token based transaction processing system is discussed in FIG. 11.

Figure 6:
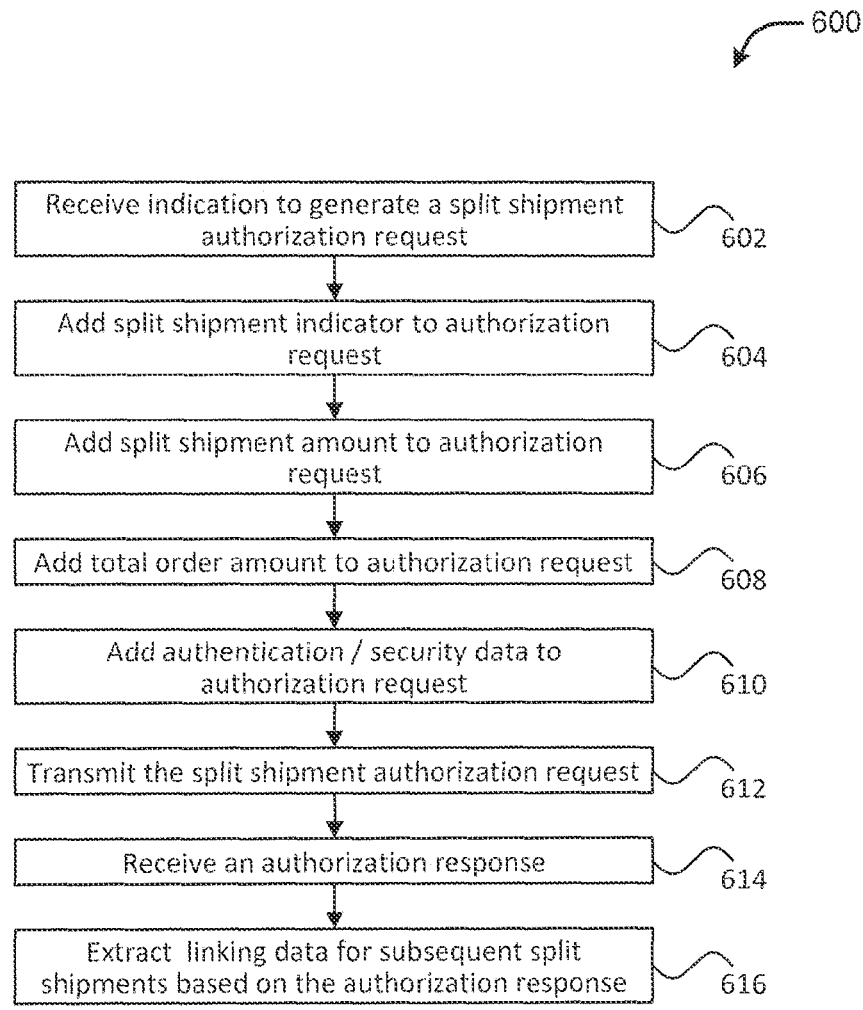
FIG. 6 illustrates an exemplary process for obtaining authorization for a split shipment transaction, in accordance with embodiments.

FIG. 6 illustrates an exemplary process 600 for obtaining authorization for a split shipment transaction, in accordance with embodiments. In some embodiments, the process 600 may be used obtain initial authorization for a split shipment and for obtaining linking data used for subsequent split shipment authorizations. Aspects of the process 600 may be performed, in some embodiments, by a merchant computer such as discussed in connection with FIGS. 1 and 3. Some or all aspects of the process 600 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

The process 600 can include receiving 602 an indication to generate a split shipment request. In an example, the indication may be generated based on completion of a customer's check out process. In some examples, the indication may be provided by an inventory management system of a merchant. The indication may be generated when it is determined that a purchase order needs to be split into multiple shipments. For example, items of the purchase order may not be all available and/or the items may need to be shipped from different locations or by different suppliers. In some examples, the indication may be provided based on messages from one or more suppliers regarding the availability of the items. Alternatively or additionally, the indication to generate the split shipment request may be provided when all the information required to generate a split shipment authorization request is available. For instance, the indication may be provided when a consumer, a consumer account, a device, or a transaction has been authenticated (e.g., by a consumer or an authenticating computer). In an example, the merchant computer may receive an authentication response value and/or other security information from a consumer device or a third party device as evidence of the authentication success. Additionally, the information necessary to initiate authorization may include payment information such as PAN, expiration date of issuer account or payment device, and the like.

In response to receiving the indication, a split shipment authorization request similar to the example split shipment authorization request 502 of FIG. 5 may be generated. Generating the split shipment authorization request may include adding 604 a split shipment indicator, adding 606 a split shipment amount associated with the split shipment, and adding 608 a total order amount associated with the purchase order to the split shipment authorization request. The split shipment indicator may be generated by the merchant computer. The split shipment indicator may distinguish the initial split shipment from subsequent split shipments. Alternatively, the split shipment indicator may merely indicate that the associated split shipment is one of a plurality of split shipments without indicating an order.

Additionally, authentication/security data may be added 610 to the split shipment authorization request. The authentication/security data may be similar to the security/authentication data 502D discussed in FIG. 5. For instance, the authentication/security data may include a security value (e.g., CVV, CVV2, dCVV), an authentication response value (e.g., CAVV), and/or a security level indicator (e.g., ECI). In particular, the authentication response value can indicate the consumer and/or the consumer account has previously authenticated the transaction. In some embodiments, the split shipment authorization request may include other information such as other payment data, transaction information, and the like.

The split shipment authorization request thus generated may be transmitted 612 to an acquirer computer associated with the merchant computer. The acquirer computer may route the split shipment authorization request message to a payment processing network associated with the issuer identifier (e.g., a BIN) or account identifier (e.g., PAN or payment token) provided in the authorization request message.

The payment processing network may receive the split shipment authorization request, recognize that the authorization request is for a split shipment (e.g., based on the split shipment indicator), and process the split shipment authorization request accordingly. For instance, the payment processing network may validate the security/authentication data included in the authorization request (e.g., CAVV). The payment processing network may parse the authorization request message to determine the authentication response value and may access an authentication response shared secret algorithm or other encryption key that may be used to validate the authentication response value. For example, the authentication response value shared secret algorithm may include an account issuer key, or payment processing network key used to generate the authentication response value. The authentication response value shared secret algorithm may be used to generate a validation authentication value based on the data included in the authorization request. If the validation authentication value and the authentication response value match, the payment processing network may determine that the transaction was previously authenticated and determine that the likelihood that this transaction is fraudulent is low. Accordingly, the transaction may be immediately authorized or additional authentication information may be provided to an issuer to inform them that the transaction is likely authentic and should be authorized. Alternatively or additionally, the authentication response value may be authenticated by an issuer computer using an issuer shared secret key that was used by an authentication computer to generate the authentication response value through a similar validation process to that described above. In some other embodiments, validation may include looking up values (e.g., credentials) in a lookup table or database.

Additionally or alternatively, the payment processing network may be configured to validate the split shipment authorization request according to predetermined split shipment validation rules such as discussed above. Such rules may impose restrictions any aspect of the split shipment transaction such as the total split shipment amount, individual split shipment amounts, number or frequency of split shipment authorization requests, and the like. In some embodiments, such split shipment specific validation may be performed by an issuer computer instead of or in addition to the payment processing network.

The payment processing network may forward the split shipment authorization request to an issuer computer associated with the consumer account. In some embodiments, the issuer computer may be configured to recognize the split shipment authorization request (e.g., based on the split shipment indicator) and validate the request in a similar manner as performed by the payment processing network. In some other embodiments, the issuer computer may not be configured to distinguish between split shipment authorization requests and non-split shipment authorization requests. For example, split shipment indicator may be removed, masked, or ignored when the authorization request is received by the issuer computer. In such embodiments, the split shipment specific validation may be performed by the payment processing network. The non-split shipment specific validation, such as the validation of the security values and/or authentication response values may be performed by the issuer computer and/or the payment processing network.

Additionally, the issuer computer may perform a risk assessment and authorization decision-making process where the issuer computer may parse the relevant information from the authorization request message including the authentication response value, any validation information from the payment processing network related to the transaction (e.g., a risk score, results of other authentication processes, etc.) and may make a decision regarding whether the transaction is authorized.

Based at least in part on the validation and other processing by the payment processing network and/or the issuer, an authorization response may be generated by the issuer compute and/or the payment processing network. For example, authorization requests determined to be invalid by the validation processes above may be declined. The authorization response may be sent back through the payment network and ultimately received 614 by the merchant computer and the consumer. The authorization response may be similar to the exemplary authorization response 504 shown in FIG. 5. For example, the authorization response 504 can include a category indicator (e.g., ACI), payment processing transaction ID, validation data, and other response data such as status indicator (e.g., approval or decline). In particular, the validation data may include a digital signature, cryptogram, or other value that is generated based at least in part on the data in the corresponding authorization response such the authentication response value (CAVV or TAVV), total order amount, security level indicator (ECI), transaction ID, and the like. In an example, such data may be used as inputs to a secret or shared algorithm to generate the validation data. Alternatively or additionally, the validation data may be generated based on data from the authorization response such as the category indicator (e.g., ACI), validation results, status indicator, and the like. In various embodiments, the validation data may be provided by a payment processing network computer and/or an issuer computer and used to proof that authorization of a particular authorization request (e.g., with specific CAVV, total amount, ECI, and transaction ID) has occurred.

Once the authorization response is received, linking data may be extracted 616 from the received authorization response to be used for subsequent split shipment authorization requests, such as discussed in FIG. 5. For instance, the category indicator (e.g., ACI), and the validation value may be extracted and stored in a data store accessible to the merchant computer (e.g., the split shipment database 130H of FIG. 3). In some cases, at least a portion of the linking data may be stored in a data service accessible to the merchant computer (e.g., a service provided by an acquirer associated with the merchant). In some embodiments, the linking data further includes the security/authentication data included in the authorization request (e.g., CAVV, ECI). In some examples, the linking data may be encoded, encrypted, or otherwise processed to ensure security. In various embodiments, the linking data may be extracted from the authorization response and/or request and stored by any suitable entity such as a merchant computer, an acquirer computer, a payment processing network computer, an issuer computer, or a third party service provider. When the linking data is not stored by a merchant computer, the merchant computer may access the linked data indirectly via a service provided by the entity that stores the linked data, for example, using an identifier (e.g., transaction ID), a token, or any other identifying information.

Figure 7:
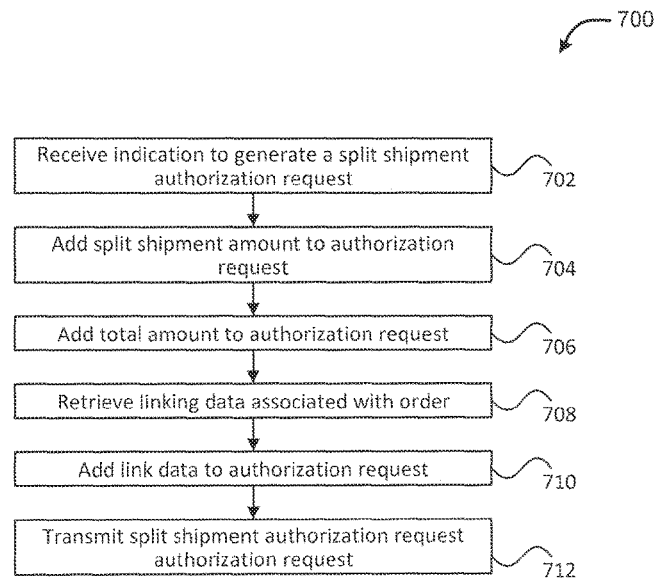
FIG. 7 illustrates an exemplary process for obtaining authorization for a split shipment transaction, in accordance with embodiments.

FIG. 7 illustrates an exemplary process 700 for obtaining authorization for a split shipment transaction, in accordance with embodiments. In some embodiments, the process 700 may be used obtain authorization for a split shipment after linking data has been received. Aspects of the process 700 may be performed, in some embodiments, by a merchant computer such as discussed in connection with FIGS. 1 and 3.

The process 700 can include receiving 702 an indication to generate a split shipment authorization request in a manner similar to that described in step 602 of the process 600 above.

In response to receiving the indication, a split shipment authorization request similar to the example split shipment authorization request 504 of FIG. 5 may be generated. For example, generating the split shipment authorization request may include adding a split shipment indicator, adding 704 a split shipment amount, and adding 706 the total amount to the authorization request.

In some embodiments, linking data associated with the entire order may be retrieved 708. The linking data may be previously extracted from one or more previous split shipment authorization messages and stored in a data store or data service such as discussed in step 616 of the process 600. The linking data may be added 710 to the split shipment authorization request. In some embodiments, the linking data may be retrieved by the transaction ID associated with the original order or any other identifying information that uniquely identifies the original order. The retrieved linking data may be encoded, decoded, encrypted, decrypted, or otherwise processed before being added to the split shipment authorization request. In some other embodiments, a token or substitute data representing the linking data may be obtained and used in the authorization request instead of the actual linking data.

The split shipment authorization request thus generated may be transmitted 712 to an acquirer computer associated with the merchant computer. The acquirer computer may route the split shipment authorization request message to an appropriate payment processing network, which may forward the authorization request to the appropriate issuer computer. The payment processing network and/or the issuer computer may be configured to validate the split shipment authorization request. For instance, the linking data may be validated similar to the validation of the security/authentication data of the initial split shipment authorization request. Additionally or alternatively, the split shipment authorization request may be validated according to one or more predefined split shipment validation rules as discussed above. Finally, an authorization response may be generated based at least in part on the validation results and provided back to the merchant computer.

Figure 8:
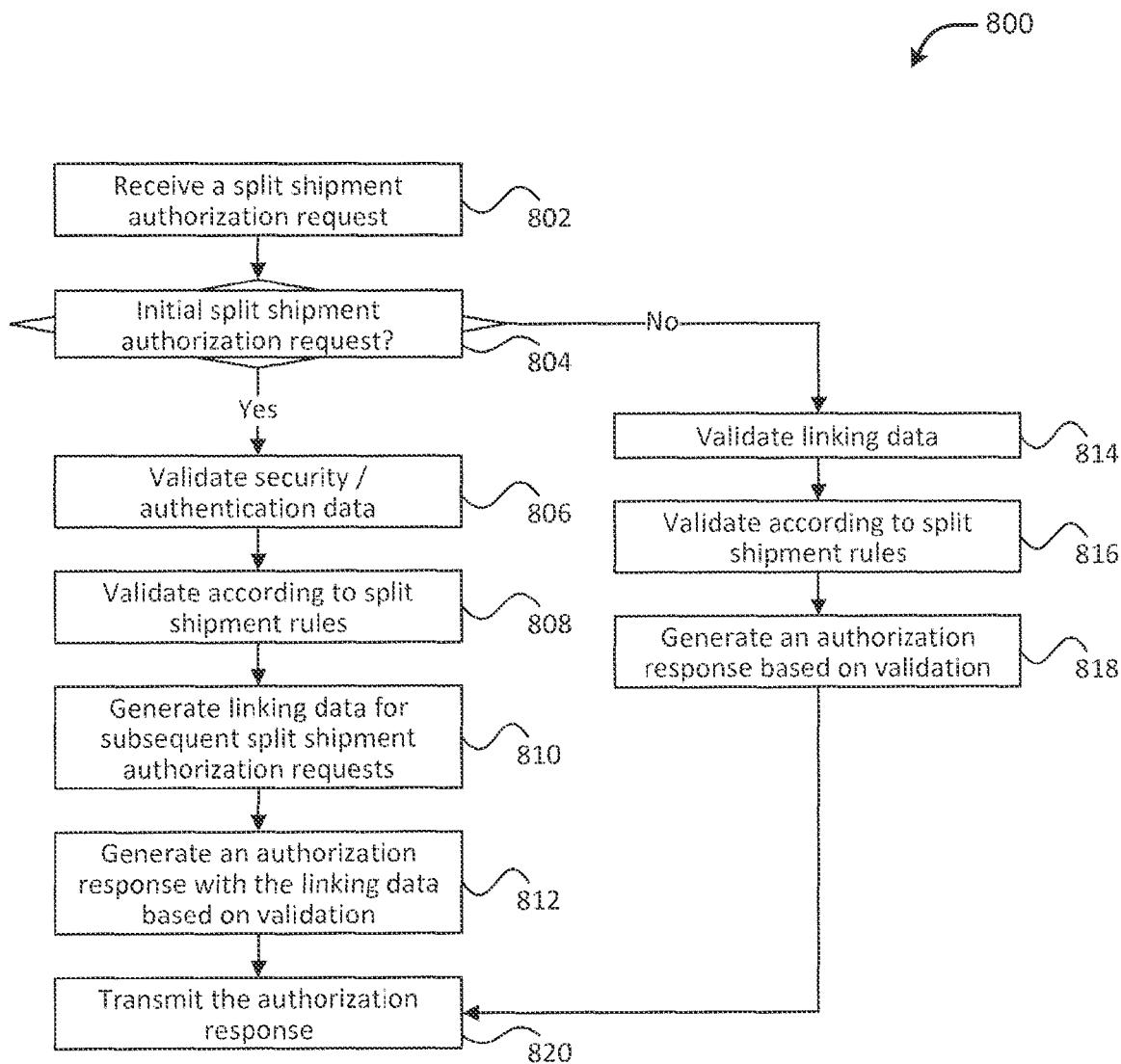
FIG. 8 illustrates an exemplary process for processing split shipment authorization requests, in accordance with embodiments.

FIG. 8 illustrates an exemplary process 800 for processing split shipment authorization requests, in accordance with embodiments. Aspects of the process 800 may be performed, in some embodiments, by a payment processing network computer or an issuer such as discussed in connection with FIGS. 1 and 4.

The process 800 can include receiving 802 a split shipment authorization request. It may be determined that the authorization request is for a split shipment based on a split shipment indicator or any other suitable data included in the authorization request (e.g., the existence of the secondary total amount data field).

In some embodiments, an initial split shipment may be treated differently than the subsequent split shipments. The initial split shipment authorization request may be used as a dual-purpose request to obtain authorization for the split shipment amount and to obtain linking data needed for subsequent split shipment authorization requests. As such, the authorization response for the initial split shipment authorization request can be generated to include the required linking data. For subsequent split shipment authorization requests, validation of the linking data may be performed. For both initial and subsequent split shipment authorization requests, validation according to the predetermined split shipment rules may be performed.

Accordingly, the process 800 can include determining 804 whether the split shipment authorization request is for an initial split shipment authorization request. The determination may be based on the split shipment indicator or other data included in the authorization request. Alternatively or additionally, the authorizing entity may be configured to determine based on internal record keeping whether the given split shipment authorization request is the very first authorization request associated with a purchase order.

If it is determined that the present split shipment authorization request is for an initial split shipment authorization, then the process 800 can include validating 806 the security/authentication data (e.g., CAVV, ECI) included in the authorization request. For instance, the security/authentication data may be validated by an issuer or payment processing network by applying a shared secret or algorithm on a given set of data elements of the authorization request (e.g., account identifier, payment token, expiration date, transaction amount, total amount, transaction time, date, etc.) to generate a validation value and comparing the validation value to the received security/authentication value. If the validation value matches the received security/authentication value, then the received security/authentication value may be determined to have been validated.

The split shipment authorization request may also be optionally validated 808 according to one or more predefined split shipment validation rules such as with respect to the total split shipment amounts relative to the total order amount, a maximum number or frequency of permissible split shipments, a maximum split shipment amount, and the like.

As discussed above, the split shipment authorization request can also be subject to risk and/or fraud analysis for regular non-split shipment authorization to determine whether the split shipment amount should be approved or declined.

For an initial split shipment authorization request, linking data similar to the linking data 508B shown in FIG. 5 may be generated. The linking data may include a category indicator (e.g., ACI), a payment processing transaction ID, and a validation value. The validation value can include a digital signature that is generated based on data elements of the authorization request including the total order amount and any other suitable data elements. In some embodiments, the linking data may be generated by one or more issuer computers, one or more payment processing network computers, or a combination of the above.

Subsequently, an authorization response may be generated 812 that includes the linking data generated above. The authorization response may also reflect the validation results associated with the validations performed above (e.g., at steps 806 and 808) as well as the other analysis results (e.g., risk or fraud analysis). Finally, the authorization response may be transmitted 820 back to an acquirer computer and/or a merchant computer. As discussed above, in various embodiments, the linking data may be extracted from the authorization response and/or request and stored by any suitable entity such as a merchant computer, an acquirer computer, a payment processing network computer, an issuer computer, or a third party service provider. When the linking data is not stored by a merchant computer, the merchant computer may access the linked data indirectly via a service provided by the entity that stores the linked data, for example, using an identifier (e.g., transaction ID), a token, or any other identifying information.

On the other hand, if it is determined at step 804 that the split shipment authorization request is not for an initial split shipment authorization, then linking data may be extracted from the authorization request and validated 814. For instance, the linking data may include security/authentication data submitted with the initial authorization request such as CAVV and ECI. Such security/authentication data may be validated similar to the validation discussed at step 806 above. The linking data may also include linking data extracted from the initial authorization response such as an ACI, payment processing transaction ID, and validation data. Such linking data may also be validated. For instance, the ACI and payment processing transaction ID may be compared with values previously stored in a data store. The validation data may be validated by similar to the validation discussed at step 806 above. For instance, a shared secret or algorithm may be applied to an authentication response value (CAVV or TAVV), the total order amount, ECI, transaction ID, and any other suitable data elements and the resulting value may be compared with the validation data. If there is a match, the received validation data may be considered valid.

The split shipment authorization request may also be optionally validated 816 according to one or more predefined split shipment validation rules. The validation of a subsequent split shipment authorization request may be the same as or similar to the validation of an initial split shipment authorization request discussed in step 808 above. In some cases, the same set of rules may be applied for a subsequent split shipment authorization request than for an initial split shipment authorization request. Alternatively, a different set of rules may apply for a subsequent split shipment authorization request than for an initial split shipment authorization request.

In some other embodiments, the initial split shipment authorization request may be processed in the same or similar manner as for the subsequent split shipment requests. For example, the linking data may have been obtained by a merchant computer before the initial split shipment authorization request (e.g., via a dummy authorization request with a $0 transaction amount and the total order amount). In such embodiments, the initial split shipment authorization request and any subsequent split shipment request may each include the same linking data. The authorization of such split shipment authorization request may be identical or similar to that for the subsequent split shipment authorization requests described in the steps 814, 816, 818, and 820 of the process 800 above.

The split shipment authorization response may be generated 818 based on the results of validation described above (e.g., at steps 814 and 816). For instance, the response may indicate that the transaction is declined if either of the validations fails and that the transaction is approved if the both validations succeed. In some cases, additional analysis (e.g., risk or fraud analysis) may be performed before a decision can be made with respect to the approval or respect of the split shipment authorization response. Finally, the generated split shipment authorization response may be transmitted 820 back to the merchant computer that initiated the split shipment authorization request via the payment processing network and/or acquirer.

The split payment processing techniques described herein provides several advantages. First, the risk of merchant fraud may be reduced by the use of verifiable linking data to tie together split shipment payments associated with a single order. Currently, a fraudulent merchant may use payment information and authorization data associated a first authorized transaction for a second unrelated and/or unauthorized payment. There is no way to securely verify the linkage between the second payment and the first. By requiring that the second authorization request include verifiable linking data that links back to the first transaction, the linkage can be validated to ensure that the merchant is not misusing the payment data associated with the first transaction for any unauthorized purposes. Furthermore, potential dispute resolution may become easier with the use of linking data. For example, given a purchase order, an audit trail of all associated split shipment payments can be determined based on the use of the linking data by the split shipment authorization requests. Lastly, customized rules and logic specific to split shipment processing may be enforced by the validation of the split shipment authorization requests. Such validation can further strengthen the security of the transaction processing system.

In some embodiments, support for the split shipment payment processing as described herein can be implemented entirely by a merchant and a payment processing network without any modification to existing implementation of issuers or acquirers. For example, validation of the linking data and validation of the split shipment specific rules can be performed entirely by the payment processing network without requiring the issuer to provide additional support for split shipment payment validation, thereby limiting the cost and complexity for the issuer. In some other embodiments, the support for the split shipment payment processing as described herein can be implemented by any other combinations of entities. For example, the methods described herein may be implemented by merchants and issuers, by merchants, a payment processing network, and issuers, or by merchants, acquirers, a payment processing network, and issuers.

Figure 9:
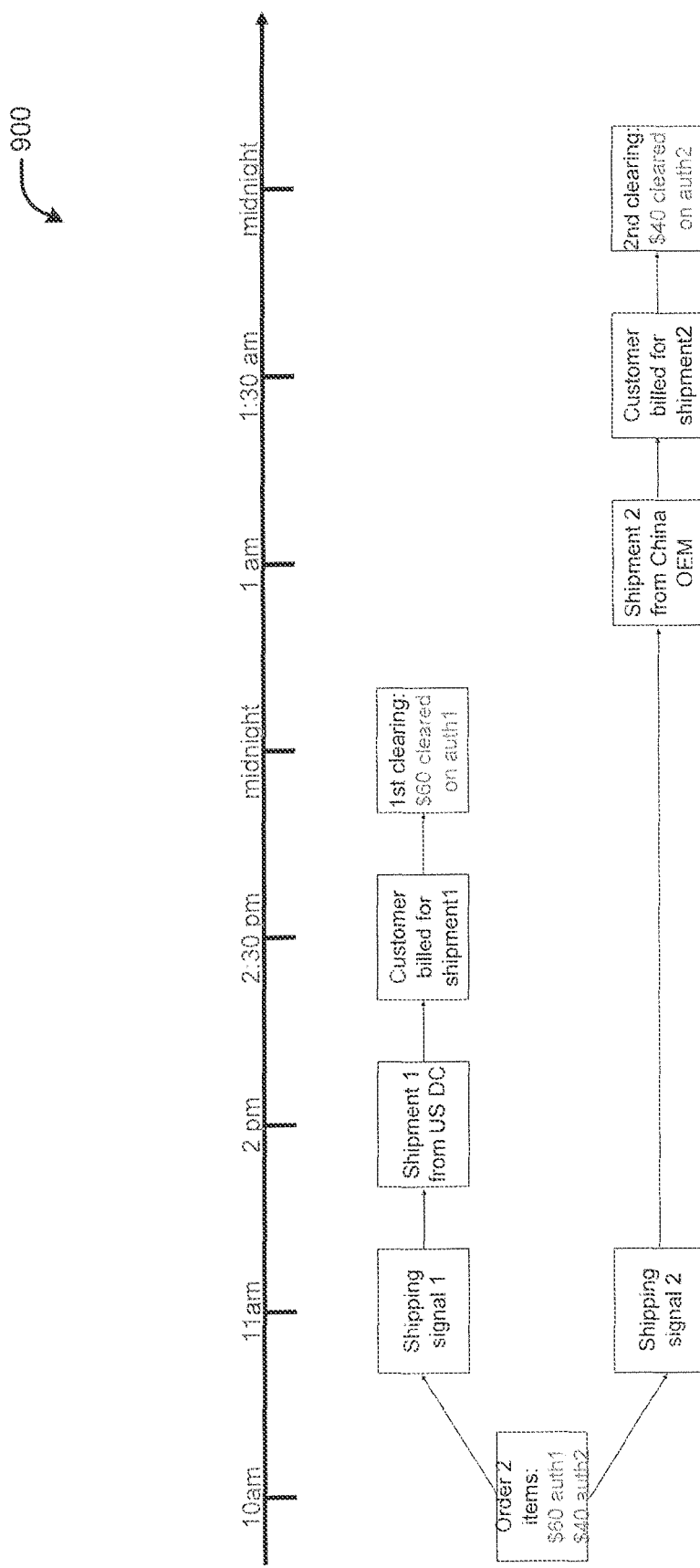
FIG. 9 shows a diagram illustrating an example method of conducting a split payment transaction, in accordance with embodiments.

FIG. 9 shows a diagram illustrating an example method of conducting a split payment transaction, in accordance with embodiments. As illustrated, a $100 order may be split into two shipping groups: a first authorization is performed for the first shipping group with a value of $60, and a second authorization is performed for the second shipping group with a value of $40. Separate authorization can be obtained for each of the split shipment groups. Shortly after the first shipping group is shipped (at 2 pm), the full value of the first authorization ($60) is cleared (at midnight). Later, when the second shipping group is shipped (at 1 am), the full value of the second authorization $40 may be cleared (at midnight). Thus, since each authorization is conducted separately, the merchant is protected from risk of declined transactions. In some embodiments, authorization must be approved (e.g., by the receipt of an authorization response message indicating approval) before the shipment is actually delivered (to guarantee payment). In some embodiments, authorization may be obtained 3 days prior to expected ship date (to give time to resolve declines).

Figure 10:
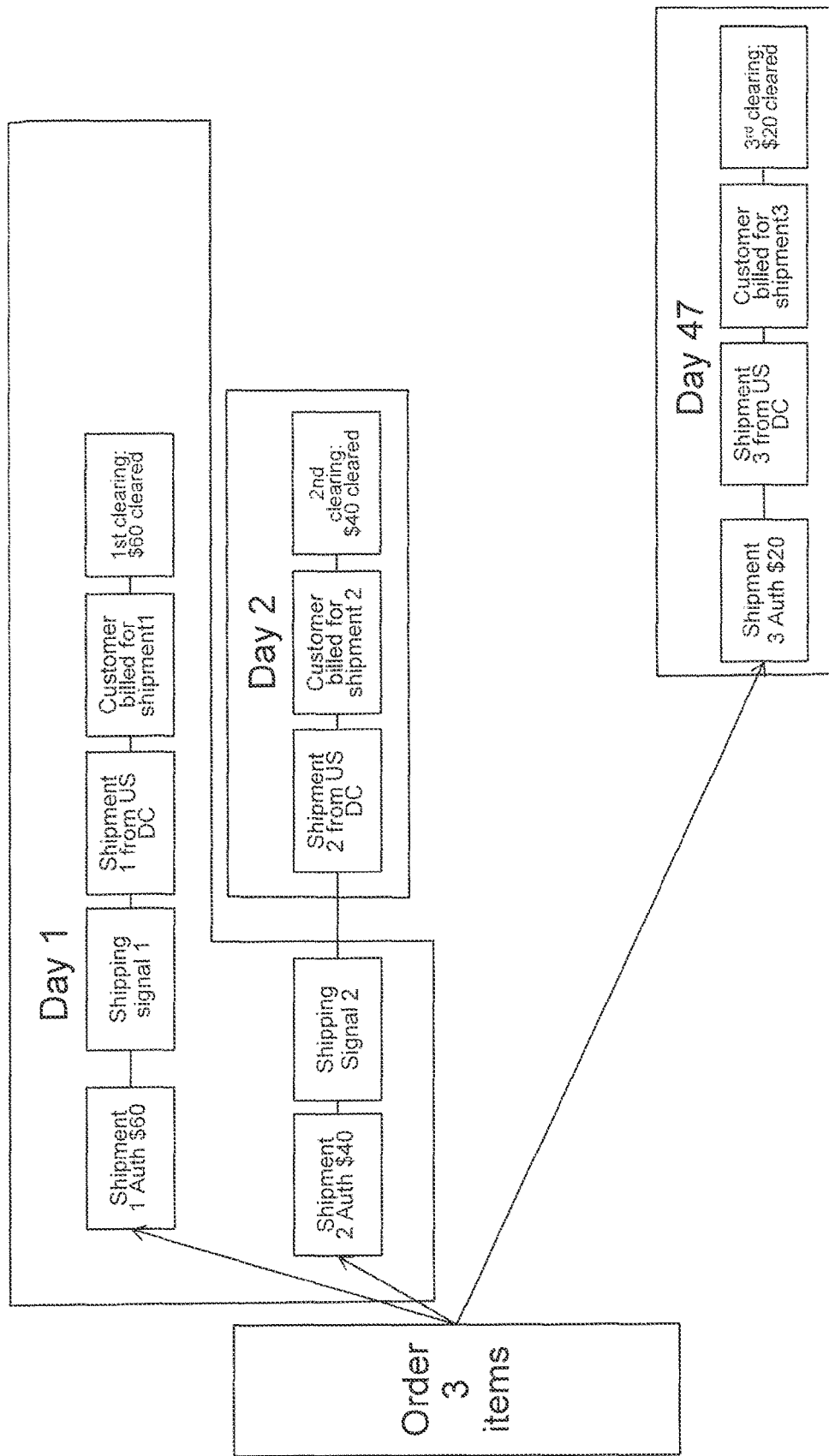
FIG. 10 shows another diagram illustrating an example method of conducting a split payment transaction, in accordance with embodiments.

FIG. 10 shows another diagram illustrating an example method of conducting a split payment transaction, in accordance with embodiments. As illustrated, a customer may order three items with a total value of $120. Separate authorization can be obtained for each of the three split shipment groups.

For instance, on Day 1, authorization for a first shipping group (e.g., for a first item) may be conducted for $60. Later on Day 1, after shipment of the first shipping group, clearing may be performed for the $60 authorization.

Similarly, authorization for a second shipping group (e.g., for the second of the three items) may be conducted for $40, also on Day 1. However, shipment of the second shipping group may be conducted on Day 2. Accordingly, clearing for the second shipping group (for $40) may be performed on Day 2.

A third shipping group (e.g., for the third item) may be delayed until Day 47 (e.g., because the third item was out of stock). Accordingly, authorization for the third shipping group may be delayed until Day 47, when it is determined that the third shipping group may be shipped. The third shipping group is shipped on Day 47, and clearing (for $20) is conducted for the third shipping group.

Thus, the method described in FIG. 10 allows authorization and clearing of each shipping group to be conducted separately, thereby avoiding the need for reauthorization when there is a substantial delay in shipping for a shipping group.

Figure 11:
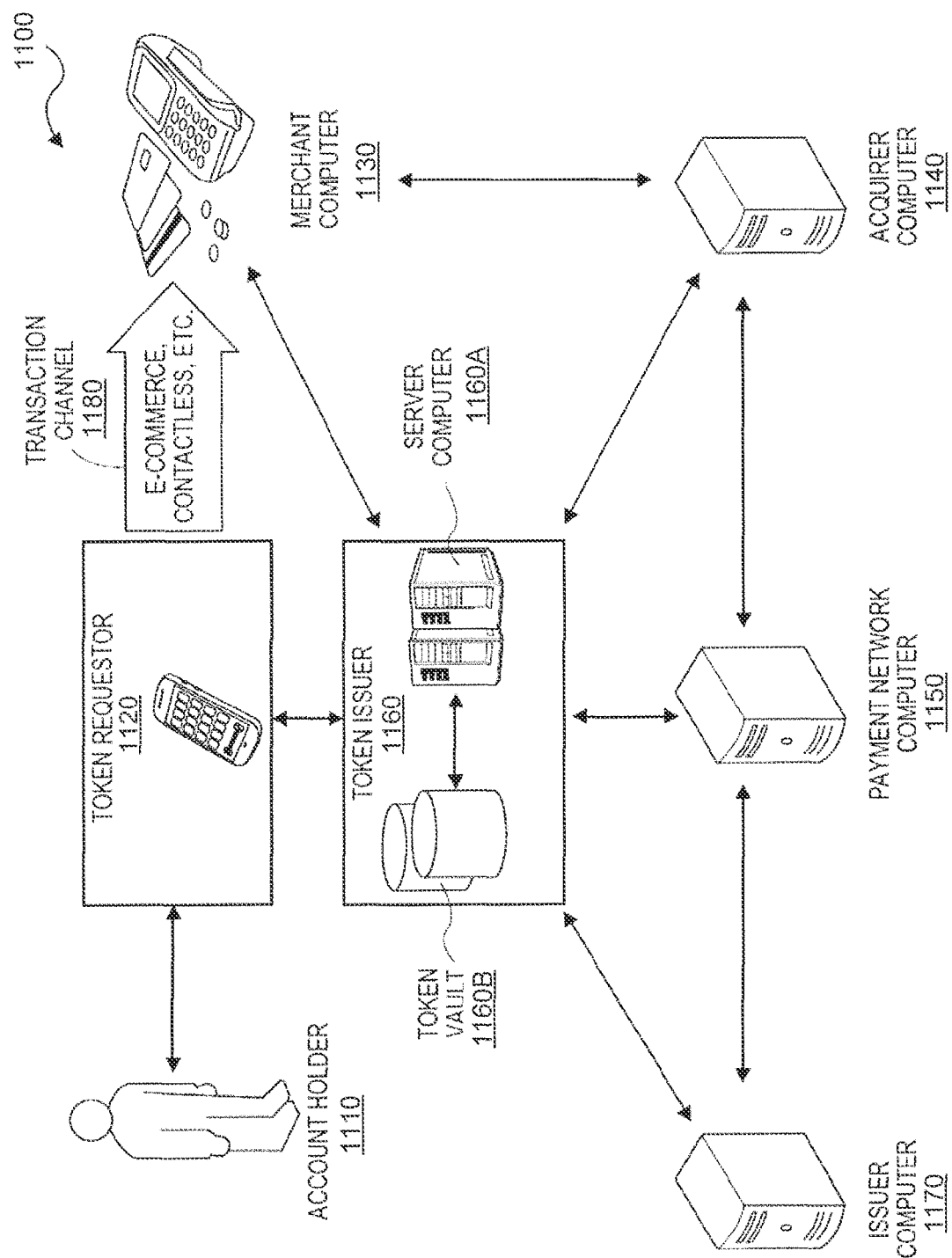
FIG. 11 depicts a block diagram illustrating a transaction processing system according to an embodiment of the present invention.

FIG. 11 depicts a block diagram illustrating a transaction processing system 1100, in accordance with embodiments. For simplicity of illustration, a certain number of components are shown is shown in FIG. 11. It is understood, however, that embodiments of the invention may include more than one of each component. In addition, some embodiments of the invention may include fewer than all of the components shown in FIG. 11. In addition, the components in FIG. 11 may communicate via any suitable communication medium (including the Internet), using any suitable communications protocol.

The transaction processing system 1100 may comprise an account holder 1110 that may use a token requestor device 1120 to request a payment token. Although the token requestor device 1120 is operated by the account holder 1110 in FIG. 11, it can be operated by any other suitable entity including a merchant, an acquirer, etc. As shown in FIG. 11, the token requester device 1120 may be in communication with a merchant computer 1130 and a token issuer computer system 1160. The token issuer computer system 1160, a merchant computer 1130, an acquirer computer, a payment network computer 1150, and an issuer computer 1170 may all be in communication with each other. The various entities may be capable of communicating over any suitable network connection or communications system including the Internet and/or any cellular telephone network.

The token issuer computer system 1160 may include a token issuer server computer 1160A, and a token vault 1160B and rules database 1160C coupled to the token issuer computer 1160A. In some embodiments, the token issuer computer system 1160 may be characterized as token issuer and a token verifier. In other embodiments, the token issuer and the token verifier may be separate entities, where the token issuer can generate tokens, while the token verifier can validate or verify tokens issued by the token issuer.

The transaction processing system 1100 may further comprise an acquirer computer 1140, a payment network computer 1150 and an issuer computer 1170. The token requestor device 1120 may be configured to communicate with the merchant computer 1130, the acquirer computer 1140, the payment network computer 1150, and the issuer computer 1170 through a transaction channel 1180. The transaction channel 1180 may include a communication path between one or more of the token requestor device 1120, the merchant computer 1130, the acquirer computer 1140, the payment network computer 1150, and the issuer computer 1170. The transaction channel 1180 may be a communication channel, which allows for communication with the issuer computer 1170 during an electronic payment transaction The transaction channel 1180 may include one or more sub-channels. Sub-channels 1180A that may provide for communication between the token requestor device 1120 and the merchant computer 10 may include a contactless or contact communication sub-channel between the merchant computer 1130 and the token requester device 1120. They may also include a communication sub-channel between the merchant computer 1130 and the token requester device 1120 that utilizes a communication network such as the Internet.

The account holder 1110 can be a user of a portable consumer device (e.g., a credit card). The account holder 1110 may also be referred to as a "consumer" in some contexts. The account holder 1110 may utilize a communication device (e.g., a mobile phone) that can serve as the token requestor device 1120 during a transaction with a merchant.

The token requestor device 1120 may be a device that can request a payment token. In some embodiments, it may be associated with a payment account of the account holder 1110. The token requestor device 1120 may be, without limitation, a mobile device such as a mobile phone, a tablet, a PDA, a notebook computer, a key fob, or any suitable device. In other embodiments, the token requestor device 1120 may be a stationary device such as a desktop computer. In some embodiments, the token requestor device 1120 may include a digital or mobile wallet and/or a payment application that may be associated with one or more payment accounts of the account holder 1110. In some embodiments, the token requestor device 1120 may be configured to display a machine readable code such as a QR code or barcode. The token requestor device 1120 may also include a camera or a scanning device capable of scanning machine readable code.

Although not shown in FIG. 11, in some embodiments, the account holder 1110 may use a token requestor device 1120 to interface with a token requestor that may be provided through a remote computer (e.g., mobile wallet provider), etc. Accordingly, the account holder 1110 may use token requestor device 1120 to obtain a token that is stored by a remote server computer operated by a mobile wallet provider that may have previously obtained a payment token from a token issuer computer system 1160. Accordingly, there may be multiple token requestor devices in some embodiments and/or a communication device of the account holder 1110 (e.g., mobile device, laptop computer, desktop computer) that may be used to provide a previously requested token to a merchant computer 1130.

The merchant computer 1130 may be associated with a merchant. The merchant computer 1130 may be an access device such as a POS terminal at a merchant location, a computer coupled with an access device of a merchant, or a remote server computer that hosts and/or operates a web site operated by the merchant. In some embodiments, the merchant operating the merchant computer 1130 may be a card-on-file (COF) merchant. The card-on-file merchant may store account information for the account holder 1110 in a remote database for future payments (e.g., recurring or periodic payments). The merchant computer 1130 may be configured to generate an authorization request message for a transaction that is initiated by the account holder 1110.

The acquirer computer 1140 may be operated by an acquirer. An acquirer is typically a system for an entity (e.g., a bank) that has a business relationship with a particular merchant, a wallet provider or another entity. The acquirer computer 1140 may be communicatively coupled to the merchant computer 1130 and the payment network computer 1150 and may issue and manage an account of the merchant. In some embodiments, the acquirer computer 1140 may forward the authorization request message to the payment network computer 1150 and the authorization response message to the merchant computer 1130 during a transaction to confirm processing of a payment transaction.

The payment network computer 1150 may be configured to provide authorization services, and clearing and settlement services for payment transactions. A payment network computer 1150 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system that processes authorization requests and a Base II system that performs clearing and settlement services. Furthermore, the payment processing network may include a server computer and may use any suitable wired or wireless telecommunications network, including the Internet. In some embodiments, the payment network computer 1150 may forward an authorization request received from the acquirer computer 1140 to the issuer computer 1170 via a communication channel. The payment network computer 1150 may further forward an authorization response message received from the issuer computer 1170 to the acquirer computer 1140.

The issuer computer 1170 may be operated by an account issuer. Typically, the account issuer is an entity (e.g., a bank) that issues and maintains an account of the account holder 1110. The account may be a credit, debit, prepaid, or any other type of account.

In some embodiments, the issuer computer 1170 may be a computer comprising a processor and a tangible non-transitory computer readable medium coupled to the processor. The tangible non-transitory computer readable medium may comprise code, executable by the processor, for implementing a method. The method comprises receiving from a token issuer computer a user interface for providing a set of parameters to generate a payment token request rule. The method further comprises generating the set of parameters and sending the set of parameters to the token issuer computer.

The token issuer computer system 1160 may be a stand-alone entity or may be coupled to, integrated into, and/or operated or managed by any of the entities shown in FIG. 11. The token issuer computer system 1160 may issue tokens and may verify the status of tokens. In such cases, the token issuer computer system 1160 may alternatively be referred to as a token verifier or token issuer. Additionally, in some embodiments, the token issuer and the token verifier may include separate entities and/or systems that may be configured to issue or generate tokens and validate or verify tokens.

Figure 12:
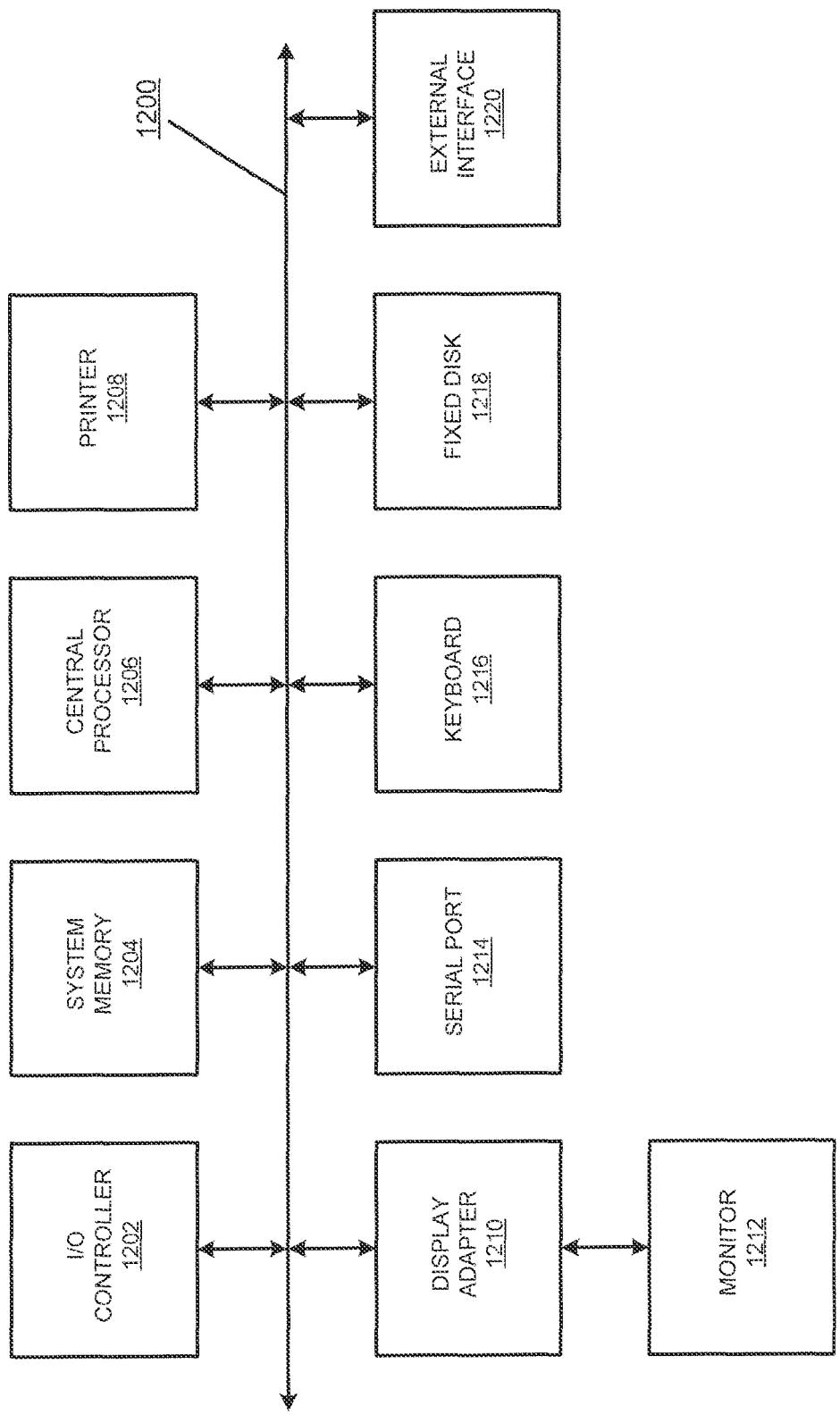
FIG. 12 shows a computing apparatus, in accordance with embodiments.

Examples of such subsystems or components are shown in FIG. 12. Any of the subsystems or components shown in FIG. 12 can be included in any of the previously described devices, apparatuses, or systems. The subsystems shown in FIG. 12 are interconnected via a system bus 1200. Additional subsystems such as a printer 1208, keyboard 1214, fixed disk 1216 (or other memory comprising computer readable media), monitor 1220, which is coupled to display adapter 1210, and others are shown. Peripherals and input/output (I/O) devices, which couple to I/O controller 1202 (which can be a processor or other suitable controller), can be connected to the computer system by any number of means known in the art, such as serial port 1212. For example, serial port 1212 or external interface 1218 can be used to connect the computer apparatus to a wide area network such as the Internet, a mouse input device, or a scanner. The interconnection via system bus allows the central processor 1206 to communicate with each subsystem and to control the execution of instructions from system memory 1204 or the fixed disk 1216, as well as the exchange of information between subsystems. The system memory 1204 and/or the fixed disk 1216 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

Any recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method, comprising:
generating, by a merchant computer, a first split shipment authorization request associated with a first split shipment of a plurality of split shipments associated with a single order, the first split shipment authorization request comprising a first split shipment indicator, a first split shipment amount associated with the first split shipment, and a total amount associated with the single order;
transmitting, by the merchant computer, the first split shipment authorization request to an authorization computer;
receiving, by the merchant computer, a first split shipment authorization response for the first split shipment authorization request from the authorization computer;
extracting, by the merchant computer, a portion of the first split shipment authorization response as part of linking data to be used for a subsequent split shipment authorization request, wherein the linking data includes 1) validation data including a validation cryptogram based upon the total amount and 2) transaction ID;
generating, by the merchant computer, a second split shipment authorization request comprising a second split shipment indicator, a second split shipment amount associated with a second split shipment of the plurality of split shipments associated with the order, the total amount associated with the order, and the linking data;
transmitting, by the merchant computer, the second split shipment authorization request to the authorization computer, wherein the authorization computer determines that the second split shipment authorization request is associated with the second split shipment using the second split shipment indicator, and validates the second split shipment authorization request by at least determining that the first split shipment amount and the second split shipment amount does not exceed the total amount in the second split shipment authorization request, and also validating the validation cryptogram; and receiving, by the merchant computer, a second split shipment authorization response from the authorization computer approving of the second split shipment authorization request.

2. The computer-implemented method of claim 1, wherein the extracted portion of the first split shipment authorization response includes a category indicator, a payment processing transaction ID, or a validation value.

3. The computer-implemented method of claim 2, wherein the validation value is generated based at least in part on the total amount.

4. The computer-implemented method of claim 1, wherein the linking data further comprises an authentication response value and a security level indicator that are provided as part of the first split shipment authorization request.

5. The computer-implemented method of claim 1, wherein the first split shipment indicator indicates an initial shipment of the plurality of split shipments and the second split shipment indicator indicates a subsequent split shipment following the initial shipment.

6. The computer-implemented method of claim 1, wherein the first split shipment indicator indicates the first split shipment of the plurality of split shipments and the second split shipment indicator indicates the second split shipment of the plurality of split shipments.

7. A computer-implemented method, comprising:
receiving, by a merchant computer, an indication to generate a split shipment authorization request for a split shipment of a plurality of split shipments associated with a single order;
retrieving, by the merchant computer, previously-stored linking data that links the split shipment to the order, the linking data extracted from a previous split shipment authorization request associated with a previous split shipment of the plurality of split shipments associated with the order, wherein the linking data includes 1) validation data including a validation cryptogram based upon a total amount of the single order, and 2) a transaction ID;
generating, by the merchant computer, the split shipment authorization request comprising a split shipment indicator, a split shipment amount associated with the split shipment, the total amount associated with the order, and the linking data; and
transmitting, by the merchant computer, the split shipment authorization request to an authorization computer, wherein the authorization computer determines that the split shipment authorization request is associated with the split shipment using the split shipment indicator, and validates the split shipment authorization request by at least determining that the split shipment amount and at least a prior split shipment amount does not exceed the total amount in the split shipment authorization request, and also validating the validation cryptogram; and
receiving, by the merchant computer, a split shipment authorization response from the authorization computer approving of the split shipment authorization request.

8. The computer-implemented method of claim 7, wherein the linking data comprises an authentication response value and a security level indicator from the previous split shipment authorization request.

9. The computer-implemented method of claim 8, wherein the authentication response value includes a cardholder authentication verification value (CAVV) or a token authentication verification value (TAVV).

10. The computer-implemented method of claim 8, wherein the security level indicator includes an electronic commerce indicator (ECI).

11. The computer-implemented method of claim 8, wherein the linking data comprises a category indicator, a payment processing transaction ID, and a validation value from a previous split shipment authorization response.

12. The computer-implemented method of claim 11, wherein the validation value is generated based at least in part on the total amount and the authentication response value.

13. The computer-implemented method of claim 7, wherein the previous split shipment authorization request is for an initial split shipment of the plurality of split shipments.

14. A computer system, comprising:
a memory that stores computer-executable instructions; and
a processor configured to access the memory and execute the computer-executable instructions to at least:
receive, from a merchant computer, a split shipment authorization request comprising a split shipment indicator, a split shipment amount associated with a split shipment of a plurality of split shipments associated with a single order, a total amount associated with the order, and linking data configured to link the split shipment authorization request to a previously-authorized split shipment of the plurality of split shipments, wherein the linking data includes 1) validation data including a validation cryptogram based upon the total amount and 2) transaction ID, wherein the validation cryptogram was transmitted to the merchant computer, by the computer system, in response to a previous split shipment authorization request;
validate the linking data by at least validating the validation cryptogram;
generate a split shipment authorization response for the split shipment amount based at least in part on a validity of the linking data; and
transmits the generated split shipment authorization response to the merchant computer.

15. The computer system of claim 14, wherein the computer system comprises a payment processing network computer.

16. The computer system of claim 14, wherein the linking data comprises an authentication response value from a previous split shipment authorization request for the previously-authorized split shipment and wherein validating the linking data comprises validating the authentication response value.

17. The computer system of claim 14, wherein the linking data comprise a validation value from a previous split shipment authorization request for the previously-authorized split shipment and wherein validating the linking data comprises validating the validation value.

18. The computer system of claim 14, wherein the computer-executable instructions, when executed by the processor, further configure the processor to validate the split shipment authorization request according to one or more predefined split shipment validation rules.

19. The computer system of claim 18, wherein the split shipment authorization response is generated based at least in part on the validation of the linking data according to the one or more predefined split shipment validation rules.

20. The computer-implemented method of claim 1, wherein the first split shipment authorization request is transmitted to the authorization computer via an acquirer computer and a payment processing network.

\* \* \* \* \*